(12) United States Patent
Petters et al.

(10) Patent No.: US 12,141,099 B2
(45) Date of Patent: Nov. 12, 2024

(54) SCALABLE MULTI-TIER STORAGE STRUCTURES AND TECHNIQUES FOR ACCESSING ENTRIES THEREIN

(71) Applicant: Microsoft Technology Licensing, LLC, Redmond, WA (US)

(72) Inventors: Vladimirs Petters, Bellevue, WA (US); Roopesh Battepati, Bellevue, WA (US); David Kruse, Kirkland, WA (US); Mathew George, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/689,824

(22) Filed: Mar. 8, 2022

(65) Prior Publication Data

US 2022/0261377 A1 Aug. 18, 2022

Related U.S. Application Data

(62) Division of application No. 15/989,680, filed on May 25, 2018, now Pat. No. 11,301,421.

(51) Int. Cl.
*G06F 16/16* (2019.01)
*G06F 16/182* (2019.01)

(52) U.S. Cl.
CPC ........ *G06F 16/162* (2019.01); *G06F 16/1827* (2019.01)

(58) Field of Classification Search
CPC ... G06F 16/162; G06F 16/164; G06F 16/1827
(Continued)

(56) References Cited

U.S. PATENT DOCUMENTS 8,438,196 B1 * 5/2013 Cook .................... G06F 16/113
707/831
8,818,951 B1 * 8/2014 Muntz ................. G06F 16/1827
707/639

(Continued)

FOREIGN PATENT DOCUMENTS

CN 101535968 A * 9/2009 ........... G06F 16/162
KR 20050114410 A * 12/2005

(Continued)

OTHER PUBLICATIONS

Cai, et al., "A Metadata Management Method Base on Directory Path Code", In Journal Of Software, vol. 9, Issue 9, Sep. 2014, pp. 2443-2453.*

(Continued)

*Primary Examiner* — Giovanna B Colan
(74) *Attorney, Agent, or Firm* — Newport IP, LLC; Jacob P. Rohwer

(57) ABSTRACT

Examples described herein generally relate to a scalable multi-tier storage system. An entry may be added and/or deleted within the storage system. To delete an entry, the storage system may determine whether the entry corresponds to the file or the directory based on directory metadata, and request deletion of the directory metadata associated with the entry from the directory volume based on determining that the entry corresponds to the directory, and further requesting deletion of the file from a file volume based on a determination that the entry corresponds to the file. To add a file, the storage system may generate directory metadata associated with the entry in the directory volume based on a determination that the entry corresponds to the directory, and may further allocate file metadata in the file volume based on a determination that the entry corresponds to the file.

20 Claims, 22 Drawing Sheets

(58) Field of Classification Search
USPC ........................................................ 707/829
See application file for complete search history.

(56) References Cited

U.S. PATENT DOCUMENTS

| | | | |
|---|---|---|---|
| 8,984,221 | B2 | 3/2015 | Satoyama et al. |
| 10,084,873 | B2 | 9/2018 | Dornemann |
| 10,140,304 | B1 * | 11/2018 | Bent ........................ G06F 16/13 |
| 10,353,790 | B1 | 7/2019 | Rangaiah et al. |
| 10,387,381 | B1 * | 8/2019 | Patwardhan .......... G06F 16/164 |
| 10,678,452 | B2 * | 6/2020 | Karr ........................ G06F 3/0685 |
| 11,204,892 | B2 | 12/2021 | George et al. |
| 2009/0106255 | A1 | 4/2009 | Lacapra et al. |
| 2010/0070726 | A1 | 3/2010 | Ngo et al. |
| 2010/0274784 | A1 * | 10/2010 | Acharya ............... G06F 16/164 |
| | | | 707/E17.143 |
| 2010/0332401 | A1 * | 12/2010 | Prahlad ................. G06F 16/122 |
| | | | 711/E12.001 |
| 2011/0161299 | A1 | 6/2011 | Prahlad et al. |
| 2012/0072596 | A1 * | 3/2012 | Kruse ................. G06F 21/6227 |
| | | | 711/E12.017 |
| 2012/0084523 | A1 | 4/2012 | Littlefield et al. |
| 2013/0268493 | A1 | 10/2013 | Berman et al. |
| 2013/0282662 | A1 | 10/2013 | Kumarasamy et al. |
| 2015/0212893 | A1 | 7/2015 | Pawar et al. |
| 2016/0371153 | A1 | 12/2016 | Dornemann |
| 2018/0322142 | A1 * | 11/2018 | Lee ........................ G06F 16/162 |
| 2019/0220528 | A1 | 7/2019 | Cruciani et al. |
| 2020/0026438 | A1 | 1/2020 | Peleg et al. |
| 2022/0114141 | A1 | 4/2022 | George et al. |

FOREIGN PATENT DOCUMENTS

| | | | | |
|---|---|---|---|---|
| WO | WO-2015145632 A1 * | 10/2015 | ........... | G06F 17/302 |
| WO | WO-2016204790 A1 * | 12/2016 | .............. | G06F 16/11 |

OTHER PUBLICATIONS

"Non Final Office Action Issued in U.S. Appl. No. 17/556,970", Mailed Date: Sep. 29, 2022, 14 Pages.

"Office Action Issued in European Patent Application No. 19728561.2", Mailed Date : Jul. 25, 2022, 8 Pages.

Seipel, et al., "Providing File Services Using a Distributed Hash", In Proceedings of 11th International Conference on Interactive Systems, Sep. 10, 2015, 6 Pages.

"Summons to Attend Oral Proceedings Issued in European Patent Application No. 19728561.2", Mailed Date: Oct. 20, 2023, 10 Pages.

"Office Action Issued in European Patent Application No. 20718437.5", Mailed Date: Oct. 26, 2023, 12 Pages.

Davies, et al., "Scale Out with GlusterFS", In Publication of Linux Journal, vol. 2013, Issue 235, Nov. 1, 2013, 4 Pages.

"Notice of Allowance Issued in U.S. Appl. No. 17/556,970", Mailed Date: Feb. 21, 2023, 9 Pages.

* cited by examiner

SCALABLE MULTI-TIER STORAGE STRUCTURES AND TECHNIQUES FOR ACCESSING ENTRIES THEREIN

CROSS-REFERENCE TO RELATED APPLICATION

This application is a divisional of, and claims priority to, U.S. patent application Ser. No. 15/989,680, filed on May 25, 2018, and entitled "SCALABLE MULTI-TIER STORAGE STRUCTURES AND TECHNIQUES FOR ACCESSING ENTRIES THEREIN", the specification of which is hereby incorporated by reference in its entirety for all that it teaches and suggests.

BACKGROUND

The present disclosure relates to computing systems, and more particularly, to a scalable multi-tier storage structure for one or more computer devices and techniques for accessing entries therein.

Network storage systems have developed in response to the increasing proliferation of data requirements. Network storage systems generally focus on the storage, protection and retrieval of data in large-scale environments. Many corporations and organizations have large sets of electronic content such as files to be stored and maintained. As time passes, these sets of content tend to grow, and ultimately reach a size which is often too great for a single repository. Nonetheless, the organization needs to manage this content in a uniform way, even if the content is spread across several physical stores. Managing such electronic content may present challenges since the size of a storage system containing the electronic content may be limited. As such, the storage system may need to be scaled to expand the storage capabilities. However, conventional scaling techniques may suffer from a number of disadvantages bound by hardware limitations (processor, memory, storage limitations, etc.).

In light of the above, it would be desirable to arrive at an approach to a storage system that may be scalable compared to conventional approaches. Thus, there is a need in the art for improvements in the scaling of storage systems across one or more storage devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure provides a method of deleting an entry from a storage system. The method may include receiving, at the storage system, a deletion request for the entry, the entry corresponding to either a file or a directory in the storage system. The method may further include determining directory metadata from a directory volume, the directory metadata associated with the entry. The method may additionally include determining whether the entry corresponds to the file or the directory based on the directory metadata. Moreover, the method may include requesting deletion of the directory metadata associated with the entry from the directory volume based on a determination that the entry corresponds to the directory. The method may also include requesting deletion of the directory metadata associated with the entry from the directory volume and requesting deletion of the file from the file volume based on a determination that the entry corresponds to the file.

The present disclosure provides a storage system including a memory configured to store data and at least one processor in communication with the memory. The at least one processor may be configured to receive a deletion request for the entry, the entry corresponding to either a file or a directory in the storage system. The at least one processor may further be configured to determine directory metadata from a directory volume, the directory metadata associated with the entry. The at least one processor may additionally be configured to determine whether the entry corresponds to the file or the directory based on the directory metadata. Moreover, the at least one processor may be configured to request deletion of the directory metadata associated with the entry from the directory volume based on a determination that the entry corresponds to the directory. The at least one processor may further be configured to request deletion of the directory metadata associated with the entry from the directory volume and request deletion of the file from the file volume based on a determination that the entry corresponds to the file.

The present disclosure provides a computer-readable medium storing instructions executable at a storage system. The computer-readable medium including at least one instruction for causing the storage system to receive a deletion request for the entry, the entry corresponding to either a file or a directory in the storage system. The computer-readable medium further including at least one instruction for causing the storage system to determine directory metadata from a directory volume, the directory metadata associated with the entry. The computer-readable medium additionally including at least one instruction for causing the storage system to determine whether the entry corresponds to the file or the directory based on the directory metadata. Moreover, the computer-readable medium including at least one instruction for causing the storage system to request deletion of the directory metadata associated with the entry from the directory volume based on a determination that the entry corresponds to the directory. The computer-readable medium including at least one instruction for causing the storage system to request deletion of the directory metadata associated with the entry from the directory volume and request deletion of the file from the file volume based on a determination that the entry corresponds to the file.

The present disclosure provides a method of adding an entry into a storage system. The method may include receiving, at the storage system, a request for adding the entry. The method may further include determining that directory metadata associated with the entry does not exist in a directory volume. The method may further include determining whether the entry corresponds to the file or the directory. The method may further include generating the directory metadata associated with the entry in the directory volume based on a determination that the entry corresponds to the directory. The method may further include determining to add the file to a file volume, allocating file metadata in the file volume, the file metadata associated with the file, and generating the directory metadata associated with the entry in the directory volume based on a determination that the entry corresponds to the file.

The present disclosure provides a storage system including a memory configured to store data and at least one processor in communication with the memory. The at least one processor may be configured to receive, at the storage system, a request for adding the entry. The at least one processor may further be configured to determine that directory metadata associated with the entry does not exist in a directory volume. The at least one processor may further be configured to determine whether the entry corresponds to the file or the directory. The at least one processor may further be configured to determine whether the entry corresponds to the file or the directory. The at least one processor may further be configured to generate the directory metadata associated with the entry in the directory volume based on a determination that the entry corresponds to the directory. The at least one processor may further be configured to determine to add the file to a file volume, allocate file metadata in the file volume, the file metadata associated with the file, generate the directory metadata associated with the entry in the directory volume based on a determination that the entry corresponds to the file.

The present disclosure provides a computer-readable medium storing instructions executable at a storage system. The computer-readable medium including at least one instruction for causing the storage system to receive, at the storage system, a request for adding the entry. The computer-readable medium including at least one instruction for causing the storage system to determine that directory metadata associated with the entry does not exist in a directory volume. The computer-readable medium including at least one instruction for causing the storage system to determine whether the entry corresponds to the file or the directory. The computer-readable medium including at least one instruction for causing the storage system to generate the directory metadata associated with the entry in the directory volume based on a determination that the entry corresponds to the directory. The computer-readable medium including at least one instruction for causing the storage system to determine to add the file to a file volume, allocate file metadata in the file volume, the file metadata associated with the file, and generate the directory metadata associated with the entry in the directory volume based on a determination that the entry corresponds to the file.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The present disclosure will be better understood from the following detailed description read in light of the accompanying drawings, wherein like reference numerals are used to designate like parts in the accompanying description.

DETAILED DESCRIPTION

Figure 1:
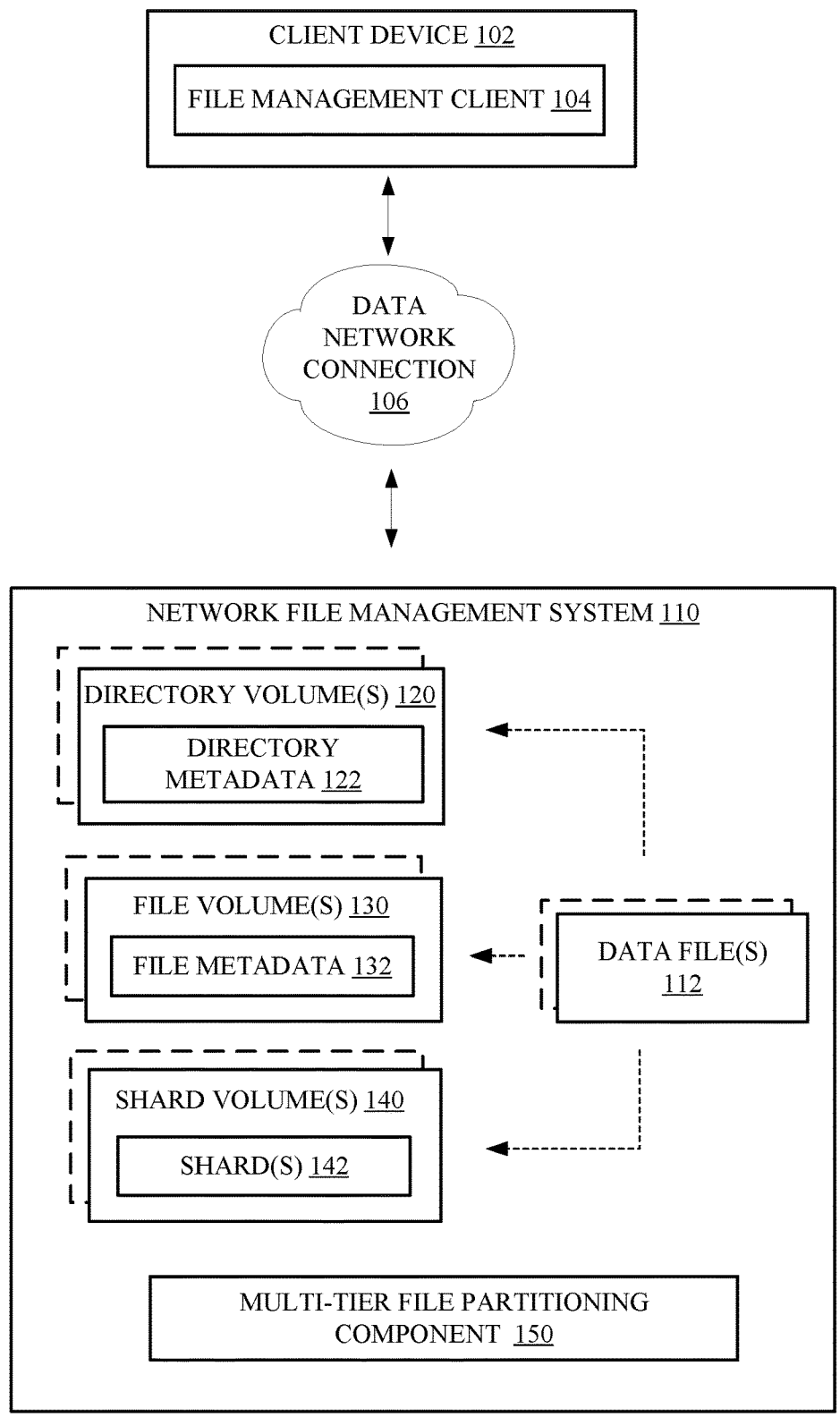
FIG. 1 is a block diagram of a client device in communication with a network file management system in accordance with one or more implementations of the present disclosure.

The present disclosure relates to a scalable multi-tier storage structure for one or more computer devices and techniques for accessing data within the multi-tier storage structure. Specifically, organizations may rely on gathering, storing, and interpreting large quantities of information. The information may be stored, for example, in file storage systems. According to particular applications, file storage systems may have various needs such as scalability. Scalability may include the ability to expand the capabilities of a storage system. For example, it may be desirable to increase the amount of files that can be stored in a system. As another example, it may be desirable to increase the speed at which files may be accessed and/or the number of users that may simultaneously access stored files.

Current implementations may have drawbacks related to scalability. In particular, in order to scale up any one particular aspect of the system an entire computer device (e.g., server machine) may have to be added. However, the addition of such a file server device may not be the best use of resources. For instance, if a file server machine is added to service more requests, its underlying storage may be underutilized. On the other hand, if a file server device is added only for increased storage, the server process may be idle most of the time. Further, changes in a server process may have to be implemented on all machines simultaneously. As such, changes to a system are essentially monolithic (e.g., the addition of one or more file servers). Accordingly, it would be desirable to provide an approach to a storage system that may have more scalable components.

The present implementations provide a scalable multi-tier storage structure. Specifically, each tier in the multi-tier structure may scale independently to meet the storage/capacity requirements associated with the respective tier. For example, each tier, or volume which may be a storage space or area configured to store distinct file-specific information may be arranged in a hierarchical structure, with a top level tier corresponding to at least one directory volume, which may store and handling high level data such as a file name associated with a file. A subsequently hierarchical tier corresponding to at least one file volume may store and handle file metadata associated with the file. A lowest hierarchical tier corresponding to at least one shard volume may store the data associated with the file in one or more shards. Each of the aforementioned volumes may form a single cluster, whereby the present implementations provide scaling across multiple storage clusters. That is, each of the volumes may scale independently of each other. Further, the scalable multi-tier storage structure may permit various file manipulation operations at the volumes.

In one example, in some implementations, a storage system may receive a deletion request for the entry, the entry corresponding to either a file or a directory in the storage system. The storage system may further determine directory metadata from a directory volume, the directory metadata associated with the entry. The storage system may additionally determine whether the entry corresponds to the file or the directory based on the directory metadata. Moreover, the storage system may request deletion of the directory metadata associated with the entry from the directory volume based on a determination that the entry corresponds to the directory. The storage system may further request deletion of the directory metadata associated with the entry from the directory volume and request deletion of the file from the file volume based on a determination that the entry corresponds to the file.

In another example, the storage system may receive, at the storage system, a request for adding the entry. The storage system may determine that directory metadata associated with the entry does not exist in a directory volume. The storage system may further determine whether the entry corresponds to the file or the directory. The storage system may determine whether the entry corresponds to the file or the directory. The storage system may generate the directory metadata associated with the entry in the directory volume based on a determination that the entry corresponds to the directory. The storage system may determine to add the file to a file volume, allocate file metadata in the file volume, the file metadata associated with the file, generate the directory metadata associated with the entry in the directory volume based on a determination that the entry corresponds to the file.

Referring now to FIG. 1, a block diagram of a data network 100 may include a client device 102 in communication with a network file management system 110. The client device 102 may execute the network file management client 104 to connect to a network file management system 110 via a data network connection 106. The network file management client 104 may be a separate application or integrated into an operating system or an internet browser platform at the client device 102. The network file management system 110 may refer to a single server or a distributed set of servers that may access a cloud data set, such as a server farm. The data network connection 106 may be an internet connection, a wide area network connection, a local area network connection, or other type of data network connections. The network file management client 104 may access and/or manipulate one or more data files 112 stored in the network file management system 110 according to a multi-tier volume storage structure that stores directory metadata 122, file metadata 132, and one or more shards 142 in separate or distinct volumes. In some implementations, a volume may correspond to storage space storing a specific type or types of data.

For example, the network file management client 110 may allow a user to access one or more data files 112 stored at the network file management system 110 and/or perform a read operation or a write operation on the one or more data files 112 over a network. For example, a read operation may send a copy of the data stored in the one or more data files 112 to the client device 110. A write operation may create or delete the one or more data file 112 and/or enters changes to the one or more data file 112 as stored in the network file management system 110.

The network file management system 110 may include a multi-tier volume storage structure that permits independent scaling of individual tiers. The individual tiers may store file-specific information unique to the individual tier, thereby allowing seamless scaling or additions to the individual tier as dictated at least by load requirements. For instance, the network file management system 110 may include one or more directory volumes 120, one or more file volumes, and/or one or shard volumes 140, each storing distinct file information in a partitioned manner. In particular, the one or more directory volumes 120 may store directory metadata 122 associated with the one or more data files 112. The one or more file volumes 130 may store file metadata 132 associated with the one or more data files 112. The one or more shard volumes 140 may store one or more shards 142 or file partitions that each contain at least a portion of the one or more data files 112.

The network file management system 110 may include a multi-tier file partitioning component 150, which may be configured to store the one or more data files 112 within the one or more directory volumes 120, one or more file volumes, and/or one or shard volumes 140 according to the multi-tier volume storage structure. Specifically, the multi-tier volume storage structure may store the one or more data files 112 as partitions such that the directory metadata 122 and file metadata 132 are partitioned, and the file content or data is sharded. In some implementations, sharding file content or data may correspond to dividing or partitioning file content or data into discrete portions or shards 142 according to a shard size. The directory metadata 122 and file metadata 132 may be stored in the one or more directory volumes 120 and the one or more file volumes 130, respectively. By structuring the one or more data files 112 in such a way, scaling of individual tiers or volumes may be readily accomplished without having to add needless components or extra storage space that may otherwise go under or unutilized.

The multi-tier file partitioning component 150 may be part of at least one of the one or more directory volumes 120, the one or more file volumes 130, and/or the one or more shard volumes 140. Further implementations with respect to the multi-tier volume storage structure of the network file management system 110 are described herein with respect to FIGS. 2-22.

In some implementations, the client device 102 may include any mobile or fixed computer device, which may be connectable to a network. The client device 102 may be, for example, a computer device such as a desktop or laptop or tablet computer, a server, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices. Further implementations with respect to example components of the network file management system 110 are described herein with respect to FIG. 22.

Figure 2:
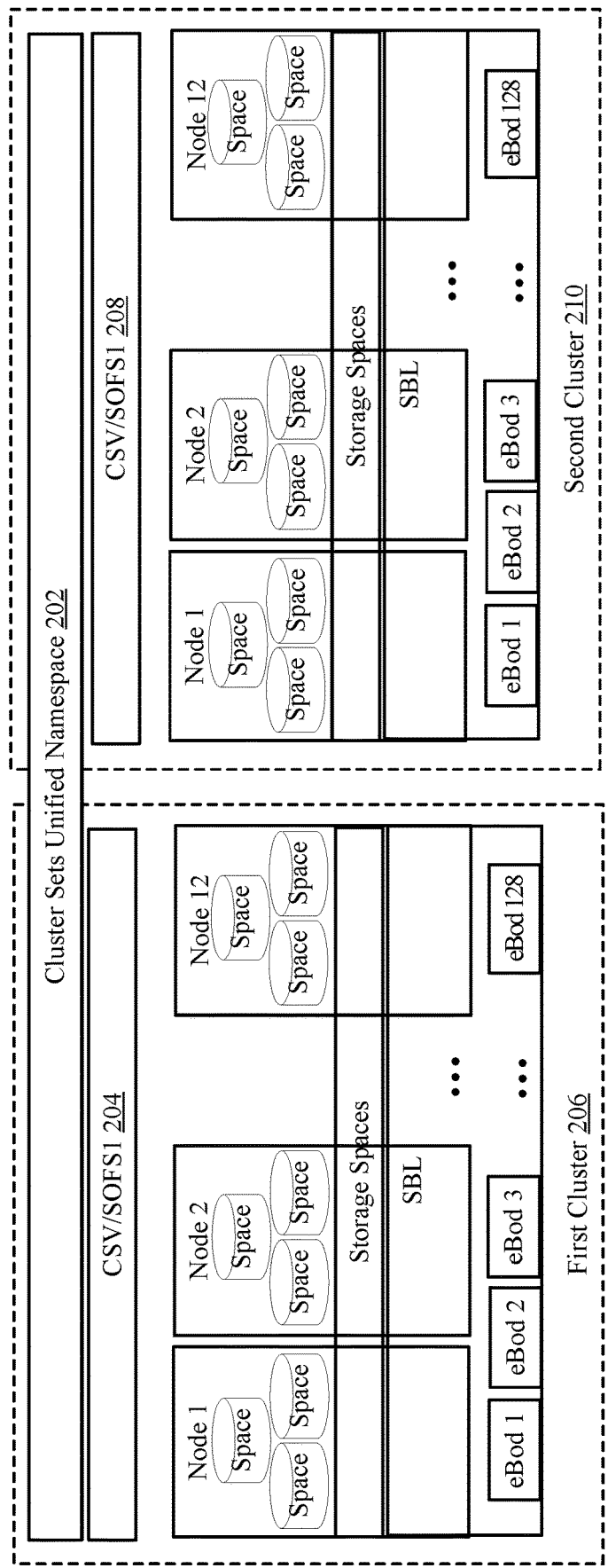
FIG. 2 is a block diagram of multiple storage clusters in accordance with one or more implementations of the present disclosure.

Referring now to FIG. 2, a storage cluster set 200 distinct from the network file management system 110 may include at least a first cluster 206 and a second cluster 210 both associated with a cluster set unified namespace 202. The first cluster 206 may include or otherwise correspond to a first cluster shared volume (CSV) and/or scale-out file server (SOFS) 204. The second cluster 210 may include or otherwise correspond to a second CSV/SOFS 208. Each of the first cluster 206 and the second cluster 210 may include one or more storage spaces, a storage bus layer (SBL), and/or one or more extended bunch of disks (eBod). The storage spaces may include one or more nodes each having individual subspaces.

In order to scale, the storage cluster set 200 may scale CPU and memory components by load balancing spaces across nodes. Additionally, free space aggregation may be supported through thin provisioning. Scaling capacity may also include by adding additional eBods. As such, the storage scale out is bound by a cluster. Each storage cluster may be an island and may scale independently up to a defined limit. A user may add additional storage clusters to the storage cluster set 200 forming islands of scale out. Further, a user may partition their load across clusters to obtain a larger scale. However, such scaling may introduce a number of potential bottlenecks at the CPU (e.g., largest consumers may be file segment (FS) stack, redundant array of independent disks (RAID) spaces, and virtual machines (VMs), the memory (e.g., largest consumers may be the FS stack, SBL cache, and VMs), storage input/output operations per second (IOPS), and storage capacity.

Figure 3:
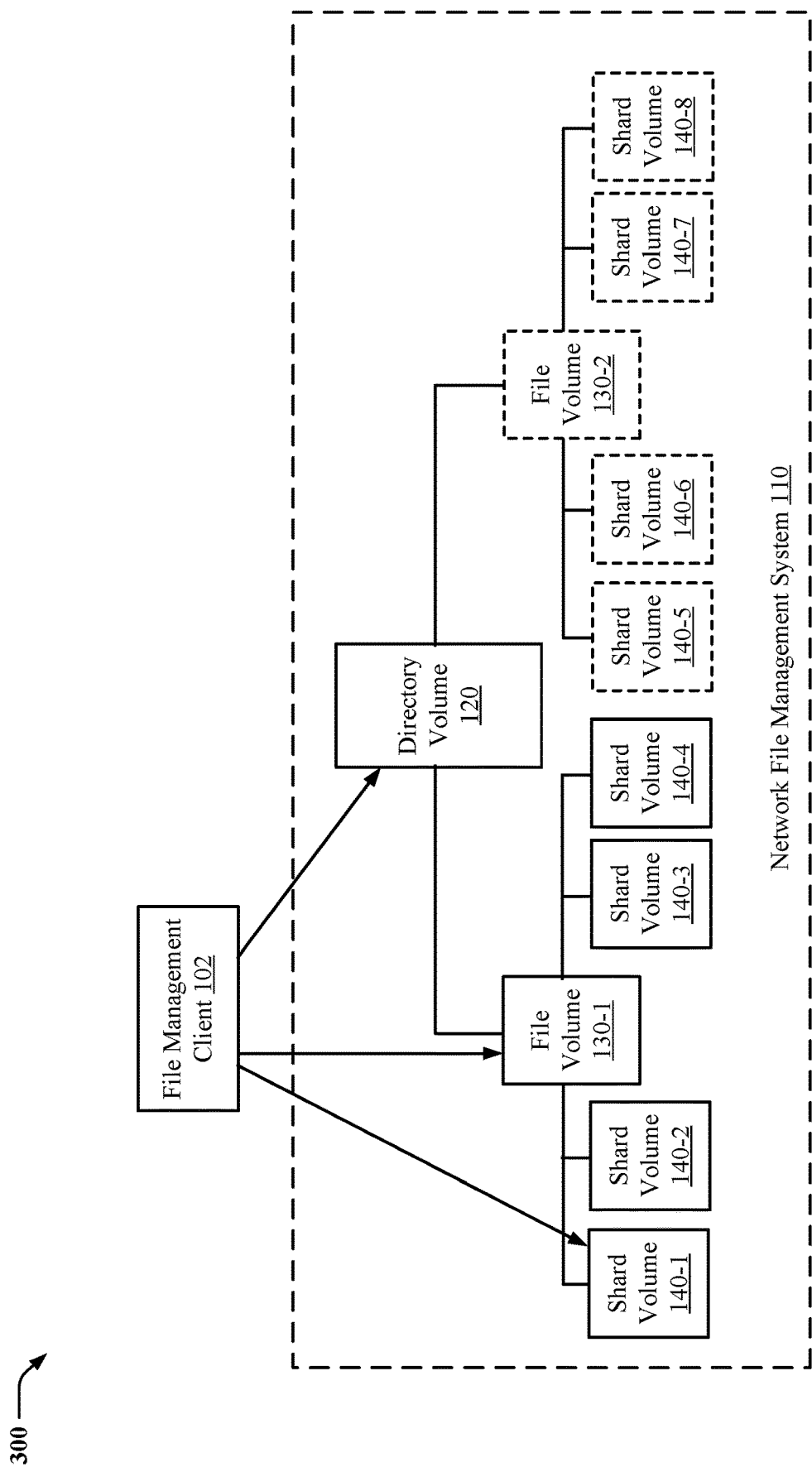
FIG. 3 is a block diagram of an example three-tier volume storage structure in accordance with one or more implementations of the present disclosure.

Referring now to FIG. 3, an example three-tier volume storage structure 300 of the network file management system 110 may permit scaling across multiple storage clusters and in a heterogeneous storage environment. The three-tier volume storage structure 300 may include at least one directory volume 120 (e.g., first tier), one or more file volumes 130-1 and 130-2 (e.g., second tier), and one or more shard volumes 140-1 to 140-8 (e.g., third tier). The directory volume 120 may be in communication with both file volume 130-1 and file volume 130-2. File volume 130-1 may be in communication with or may be used to access shard volumes 140-1 to 140-4. File volume 130-2 may be in communication with or may be used to access shard volumes 140-5 to 140-8. The three-tier volume storage structure 300 may split the directory metadata 122 from the file metadata 132 and shard file content/data (e.g., one or more shards 142). In other words, the directory metadata 132, the file metadata 132, and the file content/data (e.g., shards 142) may be extracted and/or partitioned from the one or more data files 112 and stored in separate tiers.

For example, the at least one directory volume 120 may be configured to store of the directory metadata 122. Specifically, the at least one directory volume 120 may store, for each file, file names, organize files into directories, place files on the one or more file volumes 130-1 and 130-2 using a hash function and points to them using a file identifier, create persistent reference to files on the one or more file volumes 130-1 and 130-2, may be aware of file attributes and/or file sizes, directory opportunistic locks (Oplocks), and/or may enforce quotas (e.g., related to disk storage space).

The one or more file volumes 130-1 and 130-2 may be configured to provide storage of the file metadata 132. Specifically, the files may be addressable by a file identifier unique to each file of the one or more data files 112. Further, multiple file volumes 130-1 and 130-2 may be grouped together using a hash function that allows load balancing of files across the file volumes 130-1 and 130-2. The one or more file volumes 130-1 and 130-2 may be considered a master store of information about the file. Specifically, the one or more file volumes 130-1 and 130-2 may store, for each file, the file identifier, file size, file security descriptor, shards table including a shard volume identifier and shard identifier used to access the individual shards 142 or data partitions, file attributes such as, but not limited to FILE_ATTRIBUTE_READONLY, FILE_ATTRIBUTE_ARCHIVE, FILE_ATTRIBUTE_COMPRESSED, FILE_ATTRIBUTE_INTEGRITY_STREAM, FILE_ATTRIBUTE_NO_SCRUB_DATA, and FILE_ATTRIBUTE_SPARSE_FILE, timestamps including at least one of create time, last access time, and/or last modification time.

The one or more file volumes 130-1 and 130-2 may also be configured to place and rebalance file shards 142 across the one or more shard volumes 140-1 to 140-8. Further, the one or more file volumes 130-1 and 130-2 may be configured to handle and/or resolve file sharing between volumes and/or devices. Additionally, advisory byte range locks may be determined and set by the one or more file volumes 130-1 and 130-2. The one or more file volumes 130-1 and 130-2 may also establish Oplocks to back the file metadata 132 cache on the client.

The one or more shard volumes 140-1 to 140-8 may be configured to provide storage for the shards 142 or partitioned data from the one or more data files 112. For instance, the one or more shard volumes 140-1 to 140-8 may provide available (free) space for the one or more file volumes 130-1 and 130-2 to store the shards 142 or partitioned data from the one or more data files 112. The valid data length (VDL) may be tracked for each shard 142. Further, the one or more shard volumes 140-1 to 140-8 may be aware of at least one file attribute including, but not limited to, FILE_ATTRIBUTE_READONLY, FILE_ATTRIBUTE_ARCHIVE, FILE_ATTRIBUTE_COMPRESSED, FILE_ATTRIBUTE_INTEGRITY_STREAM, FILE_ATTRIBUTE_NO_SCRUB_DATA, and FILE_ATTRIBUTE_SPARSE_FILE. The one or more shard volumes 140-1 to 140-8 may include mandatory byte range locks and/or Oplocks to back data cache on the client.

The volumes may be hierarchically ordered according to a manner of file content access. For instance, the at least one directory volume 120, or first tier, may be logically arranged ahead of the one or more file volumes 130-1 and 130-2 (second tier), and in turn, the one or more file volumes 130-1 and 130-2 may be logically arranged ahead of the one or more shard volumes 140-1 to 140-8 (third tier). As such, when a user attempts to access or perform a read/write operation associated with a file at the network file management system 110 using the file management client 102, the file management client 102 may first access the first tier, or the at least one directory volume 120. Using the directory metadata 122 associated with the file at the directory volume 120, the user may then access a file volume, or the second tier, storing the file metadata 132 associated with the file. For instance, the particular file the user desires to access may be stored at shard volume 140-7 as one or more shards 142 or file partitions. Accordingly, the user may use the file metadata 132 located at file volume 130-2 to then access shard volume 140-7 so as to access the one or more shards 142 or file partitions associated with the desired file.

Figure 4:
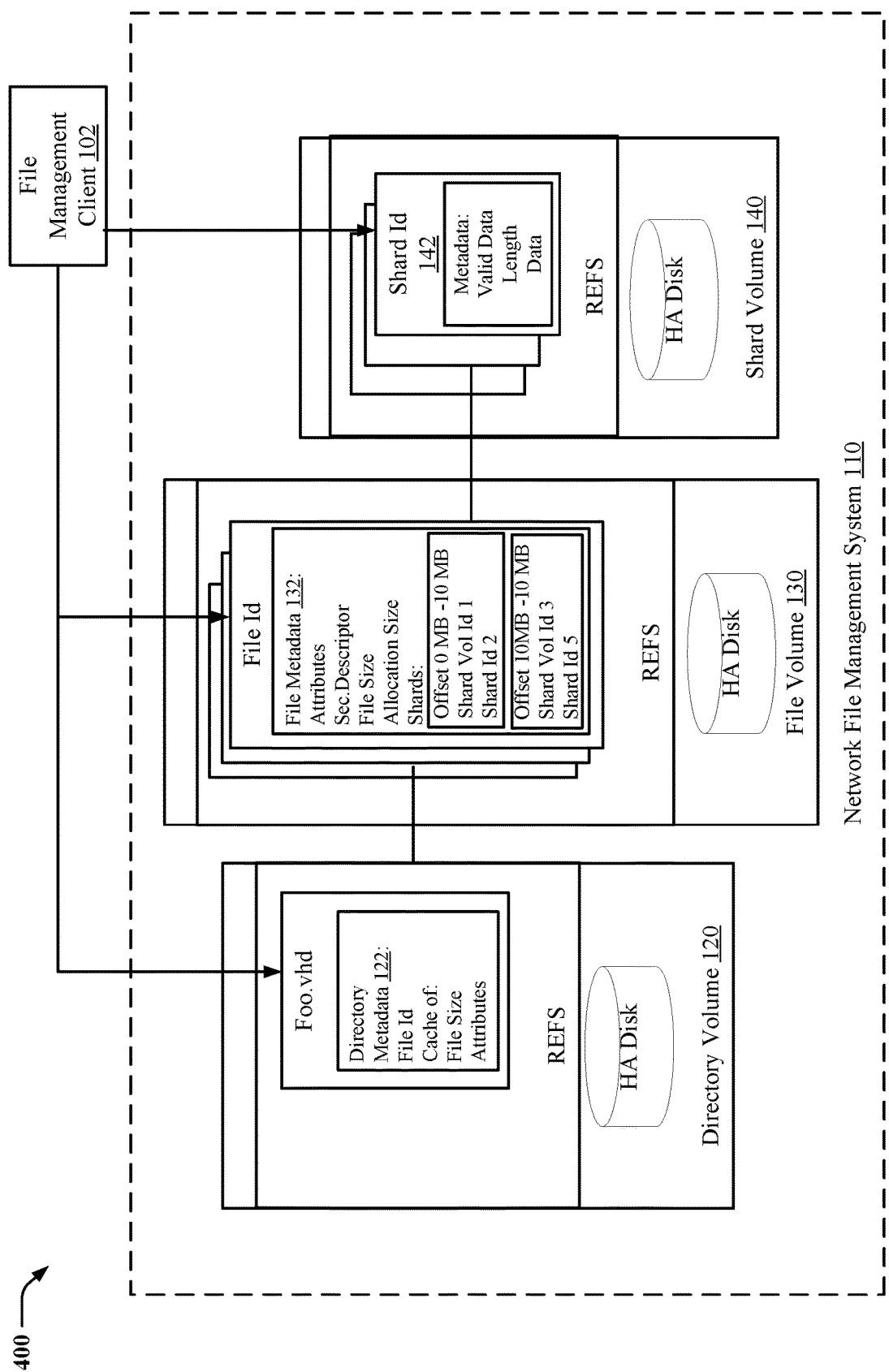
FIG. 4 is a conceptual diagram of a file partitioning scheme using a three-tier volume storage structure in accordance with one or more implementations of the present disclosure.

Referring now to FIG. 4, a file partitioning scheme 400 using a three-tier volume storage structure at the network file management system 110 is shown. Each tier, which may include one or more volumes, may include one or more resilient file system (REFS) roles. For example, at the directory volume 120 (e.g., first tier), REFS may implement a user visible directory structure which may be used when handling a number of file operations including, but not limited to, open, rename, delete, close, and/or when propagating the file metadata 132 from the file volume 130 to the directory cache. Further, at the file volume 130 (e.g., second tier), REFS may maintain metadata of or about each file and/or file shard assignments, which may be used when handling a number of file operations including, but not limited to, open, delete, set end-of-file (EOF) or allocation size, set file attributes, and/or close.

Additionally, at the shard volume 140 (e.g., third tier), REFS may correspond to a sub-locator that assists to allocate and manage shards 142 on a disk, rather than writing or implementing a separate or distinct allocator that would subdivide disk space to shards 142. Moreover, accessing shards 142 as files may provide a convenient file interface that may be used for cutting access to the storage on layout revocation by invalidating existing file opens, deleting the file during garbage collection of unused shards 142 and/or relying on REFS to lazily grow a file or files that represent the shard 142 as application writes to the shard 142.

Metadata scaling at the directory volume 120 and/or the file volume 130 may be accomplished by splitting the directory metadata 122 from the file metadata 132 so that IOPS may be distributed across multiple volumes, and metadata file cache across multiple machines/devices. As such, the directory metadata 122 and the file metadata 132 may scale independently. With respect to data scaling and free space aggregation at the shard volume 140, placing data on different volumes than metadata, and sharding a file's data across multiple volumes may assist with distributing IOPS across a much larger set of disks providing a large total throughput on what appears to the user to be a single share. Additionally, file sharding may assist with providing single free space instead of having per volume islands of free space.

As an example, to read/write data on the network file management system 110, the file management client 102 may open the file (e.g., Foo.vhd) on the directory volume 120 (e.g., which may correspond to a directory server) and query a file layout. The file layout may include the file identifier (e.g., File Id) the file volume 130 that hosts metadata for the file. The file layout may also include a cache of the file size and one or more attributes. The user may then, via the file management client 102, open the file metadata 132 (e.g., File Id) on the file volume 130 and query file layout to provide one or more shard volume identifiers and corresponding shard identifiers 142. The shard volume identifier may identify a shard volume where the one or more shards 142 are located. The shard identifier may identify the one or more shards 142 within the shard volume that contain the file. Each shard 142 may be of a fixed or variable size. Further, the file metadata 132 may include one or more attributes, a file security descriptor, a file size, an allocation size, and shard information. For each shard 142 in the file layout, the file management client 102 may open the shard 142 on the shard volume 140 and perform read/write operations.

Figure 5:
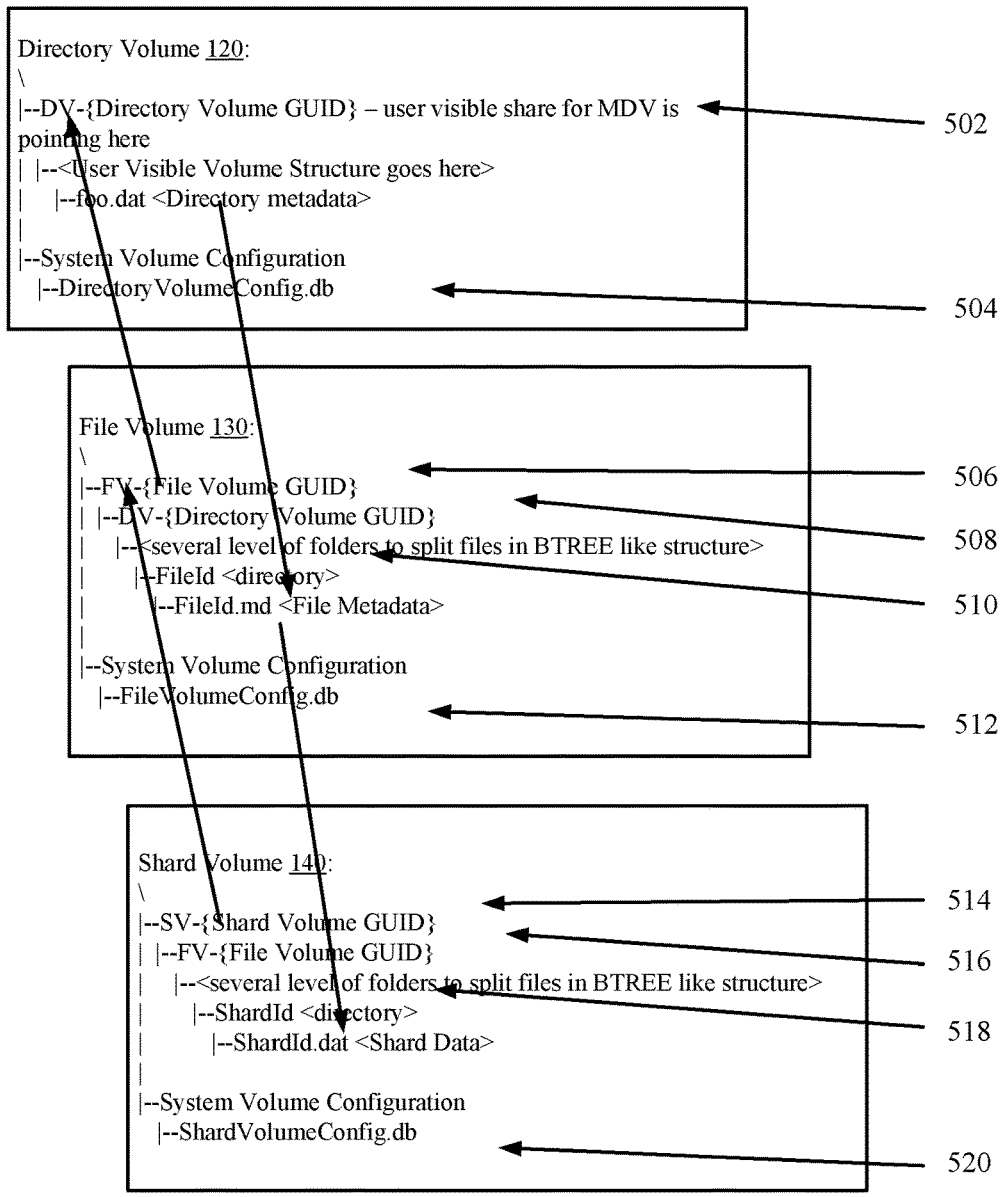
FIG. 5 is an example physical volume directory layout of the three-tier volume storage structure in accordance with one or more implementations of the present disclosure.

Referring now to FIG. 5, an example physical volume directory layout 500 of the three-tier volume storage structure may lay out logical entities such as the directory volume 120, file volume 130, and/or shard volume 140 on top of a physical entity (e.g., physical volume). The physical volume directory layout 500 may define bindings of the logical entities between each other. In some implementations, a physical volume may be a physical storage space and a logical volume may be a virtual or software defined storage space within a physical volume.

For example, at 502, every directory volume 120 may have a distinct or independent directory so as to permit collocating multiple roles on the same physical volume. At 504, directory volume(s) 120 hosted by the physical volume may be defined, and bindings between the directory volume(s) 120 and file volume(s) 130 may be included. Directory volume file system mini-filter may attach to the volume if the physical volume contains any directory volume(s) 120.

Further, at 506, every file volume 130 may have a distinct or independent directory to permit collocating multiple roles on the same physical volume. At 508, every directory volume 120 may have a distinct or independent directory to permit quick location of all files placed by the given directory volume 120. At 510, file to directory ratio may be controlled. At 512, file volume(s) 130 hosted by the physical volume may be defined, and contains bindings between the file volume(s) 130 and shard volume(s) 140 as well as bindings between directory volume(s) 120 and file volumes 130. File volume file system mini-filter may attach to the volume if the physical volume contains any file volume(s) 130.

At 514, every shard volume 140 may have a distinct or independent directory to permit collocation of multiple roles on the same physical volume. At 518, every file volume 130 may have a distinct or independent directory to allow quick location all files placed by the given file volume 130. At 520, file to directory ratio may be controlled. At 522, Defines shard volume(s) hosted by the physical volume may be defined, and bindings between these shard volume(s) 140 and file volume(s) 130 may be included. Shard volume file system mini-filter may attach to the volume if the physical volume contains any shard volume(s) 140.

In some implementations, a single physical volume can contain multiple logical directory volume(s) 120. Further, each directory volume 120 can be associated with multiple file volume(s) 130. In some implementations, a single physical volume can contain a single data or shard volume 140. Moreover, a data or shard volume 140 can be associated with multiple metadata or file volume(s) 130.

Figure 6:
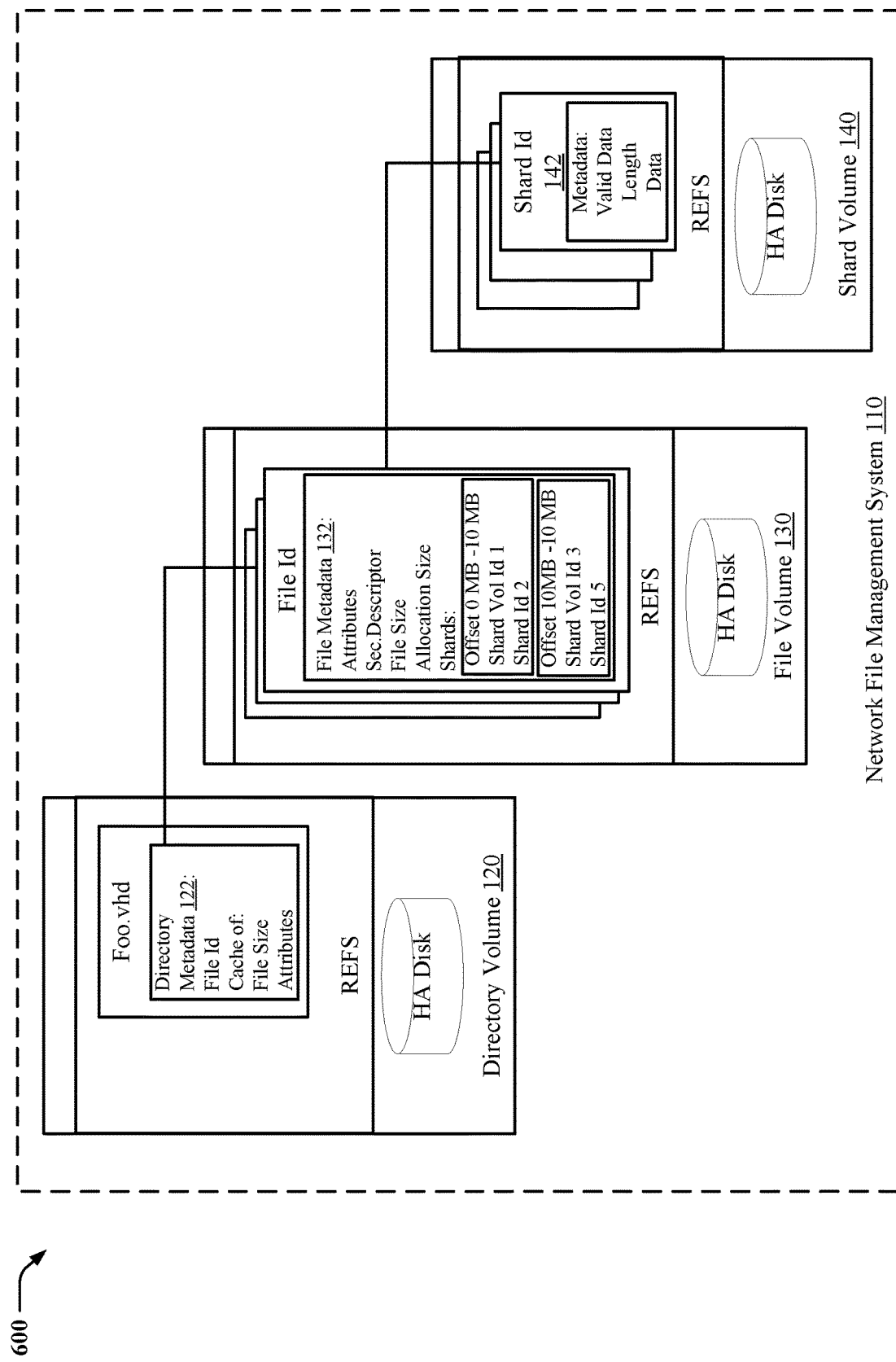
FIG. 6 is conceptual diagram of the three-tier volume storage structure represented in a hierarchical manner in accordance with one or more implementations of the present disclosure.

Referring now to FIG. 6, the three-tier volume storage structure may include a hierarchical representation 600 of the network file management system 110. At a first tier, the directory volume 120 may include the directory metadata 122 used for accessing the file metadata 132 at the corresponding file volume 130. For example, using at least the file identifier of the file metadata 132, a location of the file metadata 132 at the file volume 130 may be determined based on the directory metadata 122. At a second tier, the file volume 130 may include the file metadata 132 used for accessing the one or more shards 142 storing the file data. For instance, the file metadata 132 at the file volume 130 may include at least a shard volume identifier that identifies the shard volume 140 storing the file data, or shards 142, and the location of the one or more shards 142 within the shard volume 140 containing the file data based on a shard identifier.

At a third tier, the shard volume 140 may include the one or more shards 142 storing the file data/content. In some implementations, the shard size, or in other words, the size of the individual shards may be fixed or variable. That is, each shard may be of the same size (e.g., in megabytes (MB), gigabytes (GB), or another unit of memory size) or may be of different sizes between the one or more shards 142. Further, a shard size may increase as the file size increases. For example, for a first storage size (e.g., 100 GB), the shard size, or each individual shard may be a first size (e.g., 10 MB). Subsequently, or for a second storage size (e.g., greater than 100 GB), the shard size, or each individual shard may be a second size (e.g., 100 MB) greater than the first size. By increasing the shard size, a number of records in a run table that identifies each individual shard may be decreased.

Figure 7:
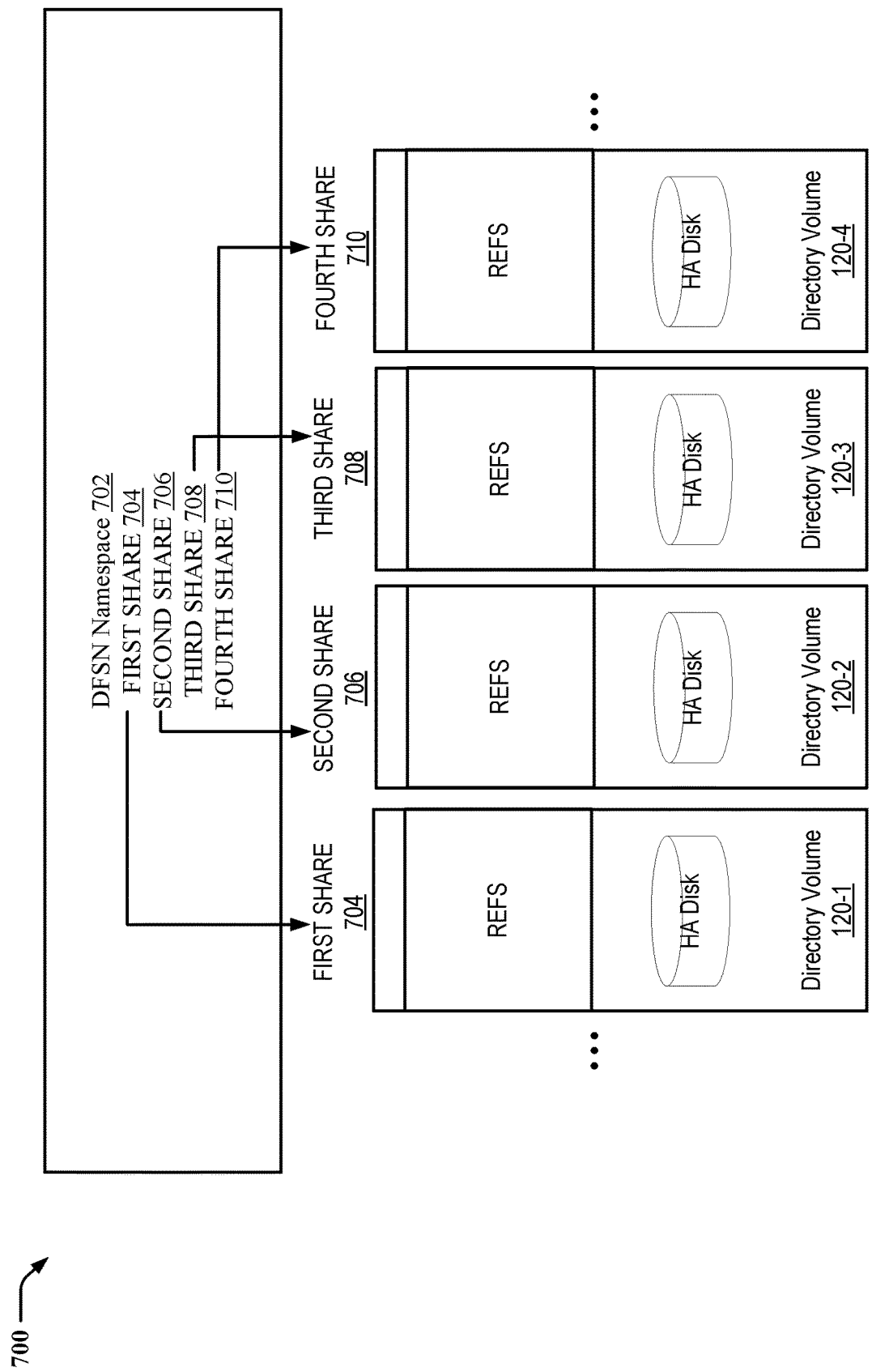
FIG. 7 is a block diagram of directory volume scale out using partitioning in accordance with one or more implementations of the present disclosure.

Referring now to FIG. 7, an example directory volume scale out 700 using partitioning of the three-tier volume storage structure is shown. The directory volume scale out 700 includes a distributed file system namespace (DFSN) 702 for each of the directory volumes. For example, each DFSN may correspond to or otherwise be associated with at least a first share 704, a second share 706, a third share 708, and a fourth share 710. The shares may correspond to different servers or separate storage spaces within a single server. The first share 704 may include a directory volume 120-1, the second share 706 may include a directory volume 120-2, the third share 708 may include a directory volume 120-3, and the fourth share 710 may include a directory volume 120-4.

In some implementations, DFSN 702 may bring the multiple directory volumes 120-1 to 120-4 under a single file server name. Each directory volume may be visible to a user as a separate share on an high availability (HA) file server. In some cases, there may be multiple file servers. Such an implementation may assist scaling by distributing directory metadata IOPS across multiple disks, and by separating directory volume metadata file cache across multiple machines. DFSN may be used at the top or initial point to expose all shares under the same file server name. Further, the directory volumes 120-1 to 120-4 may be a shared pool of volumes to place data across and may provide one pool of free space across all directory volumes 120. In some implementations, all directory volumes 120 may allocate file shards 142 from the common pool of file volumes 130 and shard volumes 140 maintaining an appearance of a single unified free space.

Figure 8:
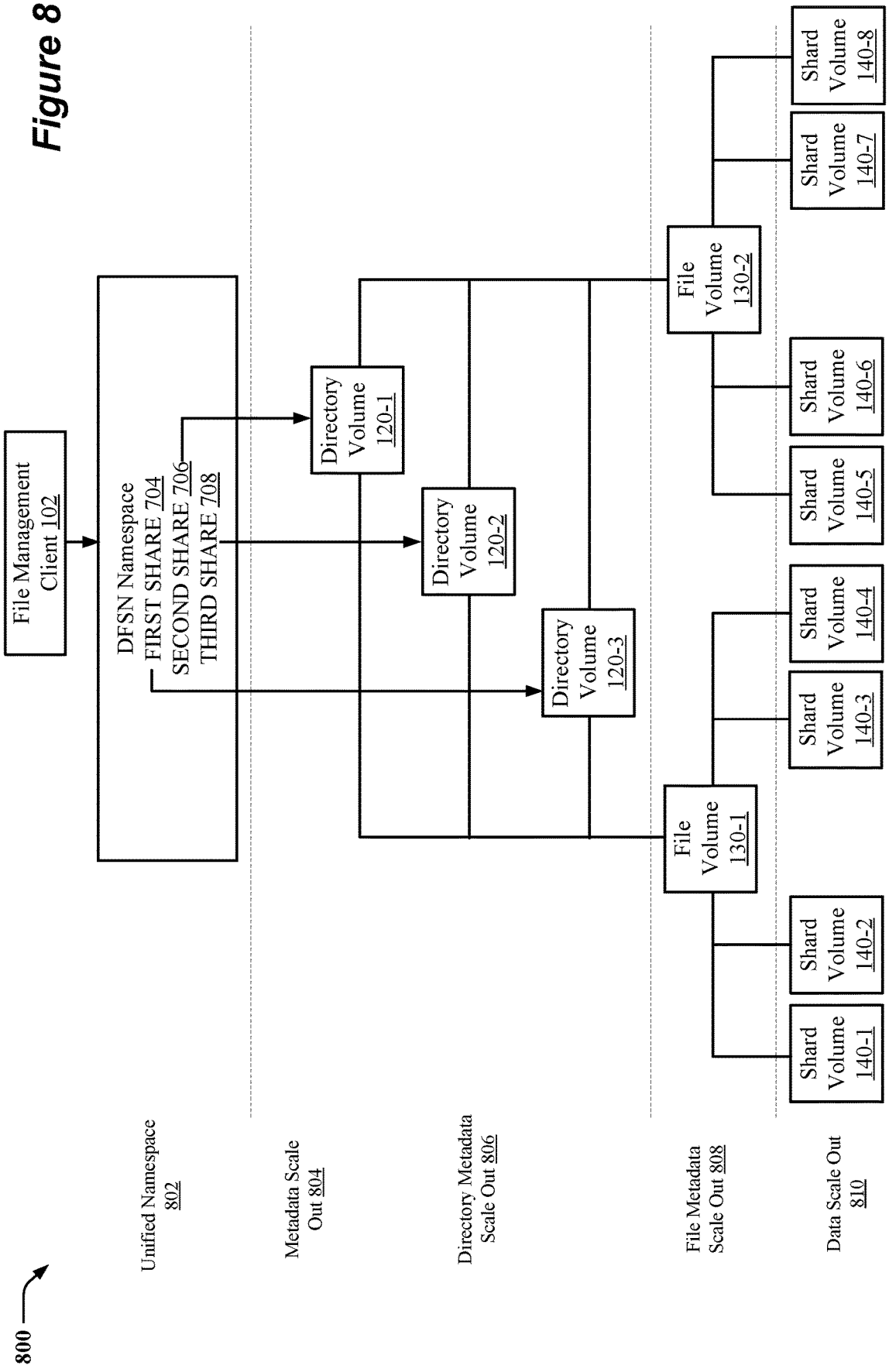
FIG. 8 is a block diagram of a three-tier volume storage structure scale out in accordance with one or more implementations of the present disclosure.

Referring now to FIG. 8, a three-tier volume storage structure scale out 800 may provide efficient scaling of individual tiers in an independent manner. Scaling tiers or volume layers may not increase latency. For instance, the three-tier scale out may require at least three open actions/events before an application can read and/or write data regardless of a number of volumes in each tier/layer (e.g., each shard requires a separate open).

Specifically, a unified namespace 802 may provide access to multiple shares and/or directory volumes under a single file server name. The metadata scale out 804 may include scaling of one or both of the directory volumes 120 and/or the file volumes 130. For example, the directory metadata scale out 806 may be implemented by adding additional directory volumes to the existing directory volumes 120-1, 120-2, and 120-3, and associating each additional directory volume to the unified namespace 802. In some implementations, adding a new or additional share may implicitly add an additional directory volume. Further, adding additional directory volumes may assist with scaling directory metadata IOPs by spreading them across multiple disks, and also helps with scaling directory metadata file cache across multiple nodes. Moreover, multiple directory volumes 120 may share the same pool of file volumes 130 and shard volumes 140 providing one pool of free space.

The file metadata scale out 708 may include providing additional file volumes to the existing file volumes 130-1 and 130-2 and associating each additional file volume with at least one existing directory volume 120-1, 120-3, or 120-3, or an additional directory volume. In some implementations, if file metadata 132 updates/reads results in a bottleneck, then additional file volumes may be added to scale out. Adding file volumes 130 may assist with scaling file metadata IOPs by spreading them across multiple disks, and also helps with scaling metadata file cache across multiple nodes. Further, a single file volume 130 can host data from multiple directory volumes 120.

Further, the data scale out 810 may include providing additional shard volumes to the existing shard volumes 140-1 to 140-8. For instance, additional shard volumes may be added to the set of shard volumes 140-1 to 140-4 associated with file volume 130-1. Alternatively, or in addition to, additional shard volumes may be added to the set of shard volumes 140-5 to 140-8 associated with file volume 130-2. In some implementations, if free space falls below a defined level, or if additional IOPS/bandwidth are needed, then additional shard volumes 140 may be added.

Figure 9:
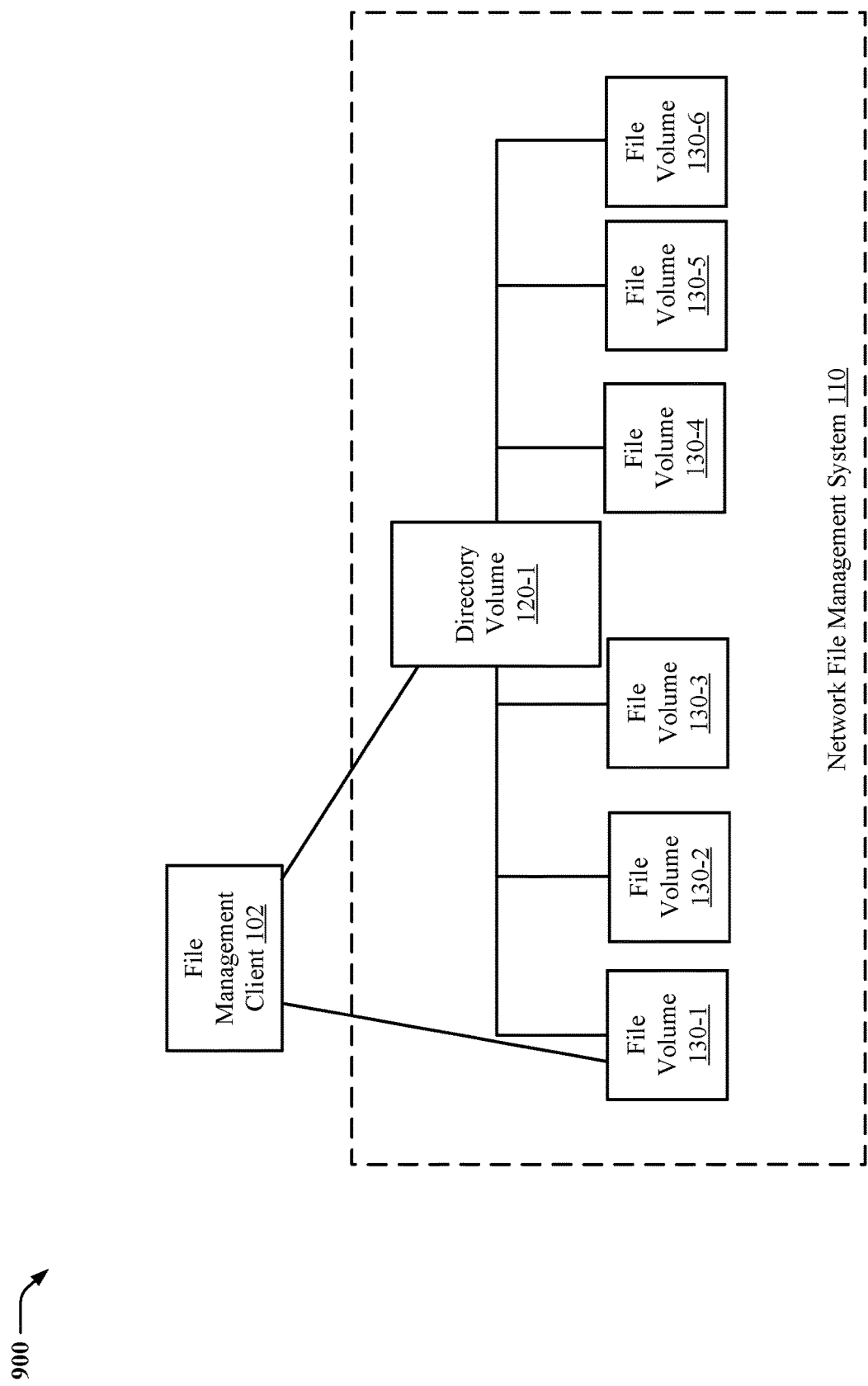
FIG. 9 is a block diagram of a file load balancing scheme in accordance with one or more implementations of the present disclosure.

Referring now to FIG. 9, a file load balancing scheme 900 may provide a two-tier volume storage structure for a network file management system 110. The file load balancing scheme 900 may separate directory metadata 122 from file metadata 132 and file data, yet may not shard the file data. In other words, the file metadata 132 and the file data of the one or more data files 112 may be on the same volume (e.g., file volume 130). For example, each file may have exactly one shard located on a file volume 130. All file metadata 132 may be located on the file volume(s) 130 along with the data of the one or more data files 112. The file load balancing scheme 900 may have a minimum impact on file opens (e.g., only two opens to access data on a given file).

Further, a maximum file size may be limited by the free space on the volume it is placed.

For example, the directory volume 120 may be configured to store the directory metadata 122. Specifically, the at least one directory volume 120 may store, for each file, file names, organize files into directories, place files on the one or more file volumes 130-1 to 130-6 using a hash function and points to them using a file identifier, create persistent reference to files on the one or more file volumes 130-1 to 130-6, may be aware of file attributes and/or file sizes, Oplocks, and/or may enforce quotas (e.g., related to disk storage space).

The file volumes 130-1 to 130-6 may be configured to provide file metadata 132 store and file data store. In particular, each of the file volumes 130-1 to 130-6 may provide available (free) space for the directory volume 120. The files may be addressable by a file identifier unique to each file of the one or more data files 112. The one or more file volumes 130-1 to 130-6 may be considered a master store of information about the file. For instance, each of the one or more file volumes 130-1 to 130-6 may store, for each file, the file identifier, persistent reference count, file size, VDL tracker, file security descriptor, shards table, file attributes such as, but not limited to FILE_ATTRIBUTE_READONLY, FILE_ATTRIBUTE_ARCHIVE, FILE_ATTRIBUTE_COMPRESSED, FILE_ATTRIBUTE_INTEGRITY_STREAM, FILE_ATTRIBUTE_NO_SCRUB_DATA, and FILE_ATTRIBUTE_SPARSE_FILE, timestamps including at least one of create time, last access time, and/or last modification time. The one or more file volumes 140-1 to 140-6 may include mandatory byte range locks and/or Oplocks to back data cache on the client, and file sharing between file volumes.

Figure 10:
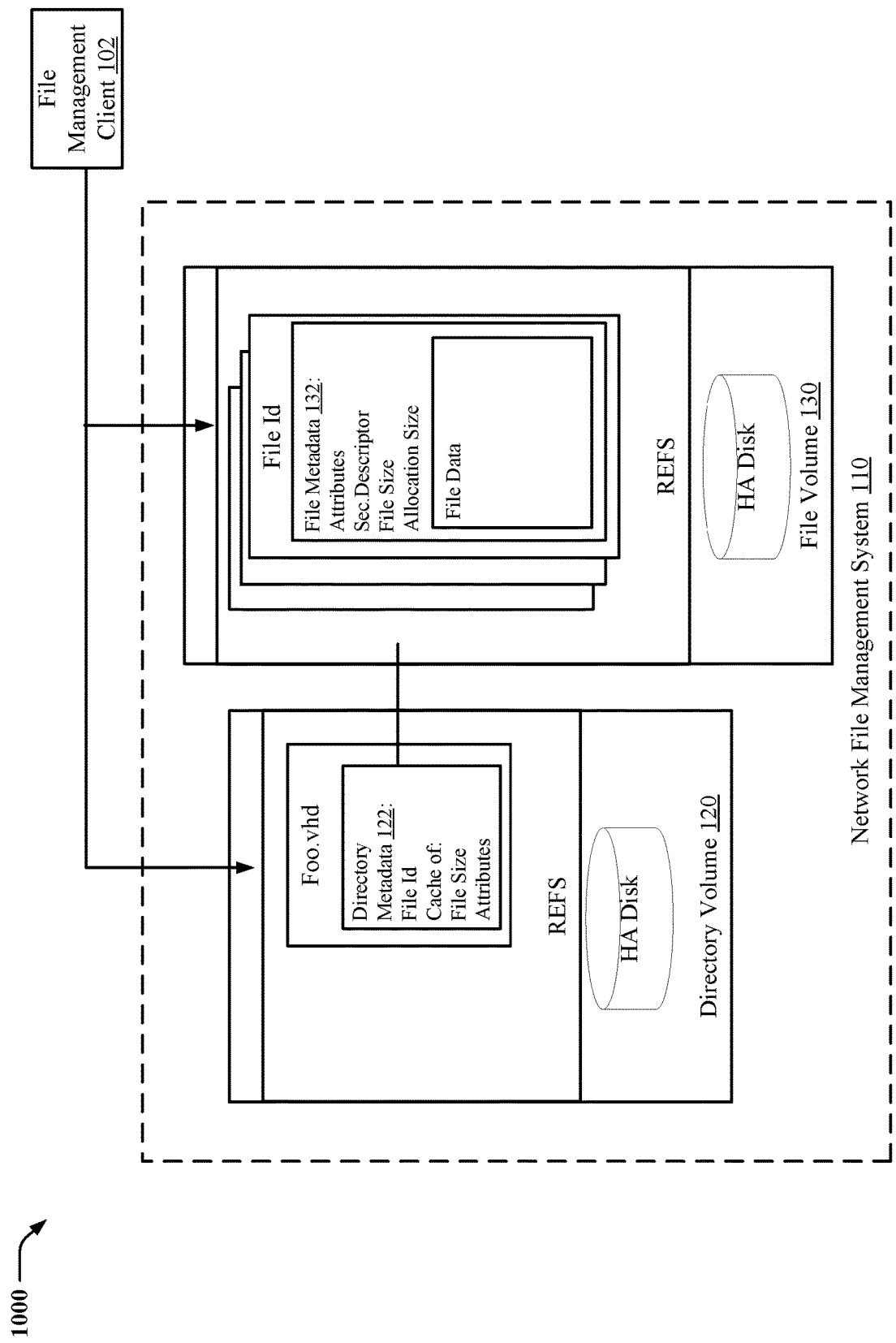
FIG. 10 is a block diagram of a two tier volume storage structure corresponding to the file load balancing scheme in accordance with one or more implementations of the present disclosure.

Referring now to FIG. 10, a two tier volume storage structure 1000 corresponding to the file load balancing scheme 900 may include the network file management system 110. Each tier, which may include one or more volumes, may include one or more REFS roles. For example, at the directory volume 120 (e.g., first tier), REFS may implement a user visible directory structure which may be used when handling a number of file operations including, but not limited to, open, rename, delete, close, and/or when propagating the file metadata 132 from the file volume 130 to the directory cache. Further, at the file volume 130 (e.g., second tier), REFS may maintain metadata of or about each file and/or file shard assignments, which may be used when handling a number of file operations including, but not limited to, open, delete, set EOF or allocation size, set file attributes, close, and/or reads/writes.

As an example, to read/write data on the network file management system 110, the file management client 102 may open the file (e.g., Foo.vhd) on the directory volume 120 (e.g., which may correspond to a directory server) and query a file identifier and file volume 130 that hosts the file metadata 132 and data for the file. The directory metadata 122 may include a file identifier of the file on the file volume 130 and a cache of one or more file sizes and/or attributes. The user may then, via the file management client 102, open the file metadata 132 (e.g., File Id) and/or data on the file volume 130 and performs read and/or write operations. The file metadata 132 may include one or more attributes, a security descriptor, a file size, and/or an allocation size.

Figure 11:
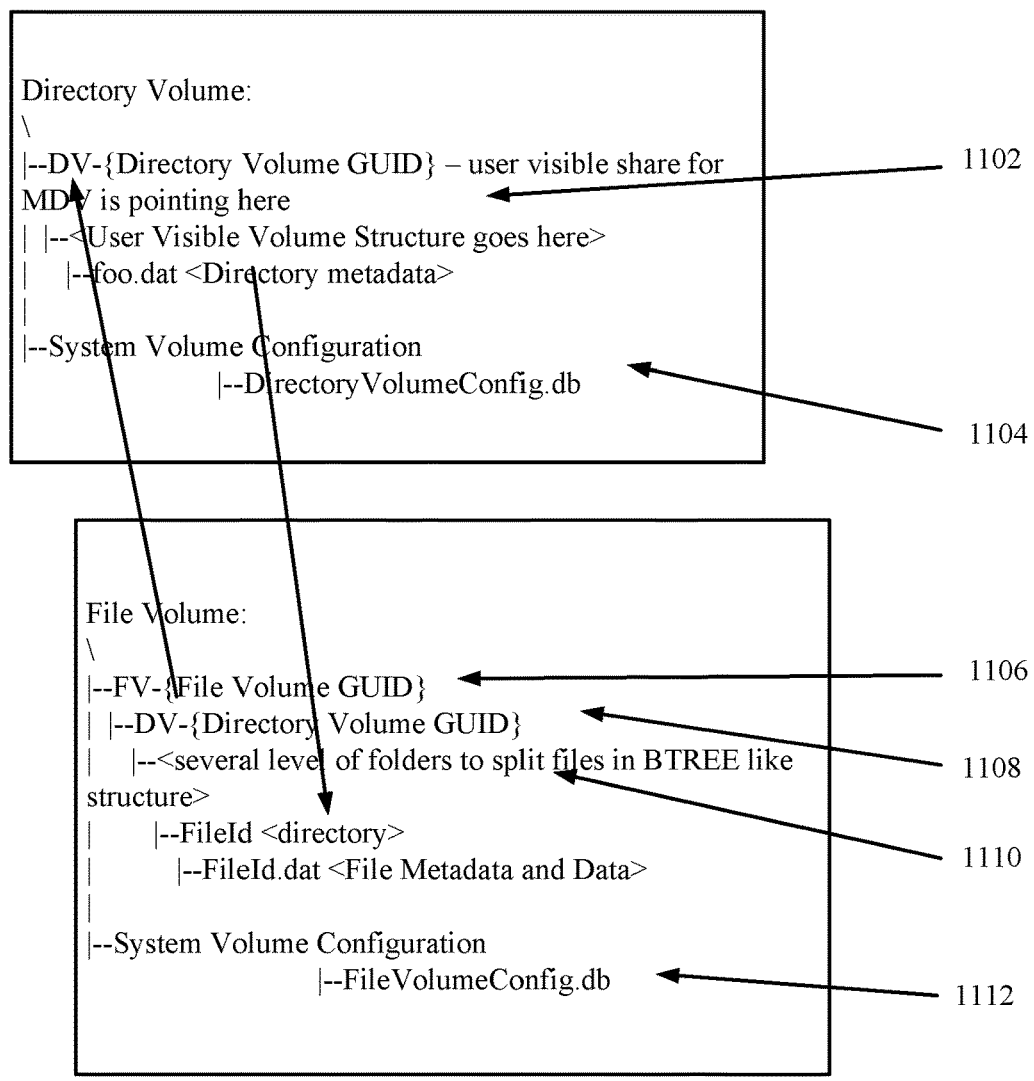
FIG. 11 is an example physical volume directory layout of the file load balancing scheme in accordance with one or more implementations of the present disclosure.

Referring now to FIG. 11, an example physical volume directory layout 1100 of the file load balancing scheme 900 may lay out logical entities such as the directory volume 120 and the file volume 130 on top of a physical entity (e.g., physical volume). The physical volume directory layout 500 may define bindings of the logical entities between each other (e.g., between directory volume 120 and file volume 130).

For example, at 1102, every directory volume 120 may have a distinct or independent directory so as to permit collocating multiple roles on the same physical volume. At 1104, directory volume(s) 120 hosted by the physical volume may be defined, and bindings between the directory volume(s) 120 and file volume(s) 130 may be included. Directory volume file system mini-filter may attach to the volume if the physical volume contains any directory volume(s) 120.

Further, at 1106, every file volume 130 may have a distinct or independent directory to permit collocating multiple roles on the same physical volume. At 1108, every directory volume 120 may have a distinct or independent directory to permit quick location of all files placed by the given directory volume 120. At 1110, file to directory ratio may be controlled. At 1112, file volume(s) 130 hosted by the physical volume may be defined, and contains bindings between the file volume(s) 130 and shard volume(s) 140 as well as bindings between directory volume(s) 120 and file volumes 130. File volume file system mini-filter may attach to the volume if the physical volume contains any file volume(s) 130. In some implementations, a single physical volume can contain multiple logical directory volumes 120. Further, each directory volume 120 can be associated with multiple file volumes 130.

Figure 12:
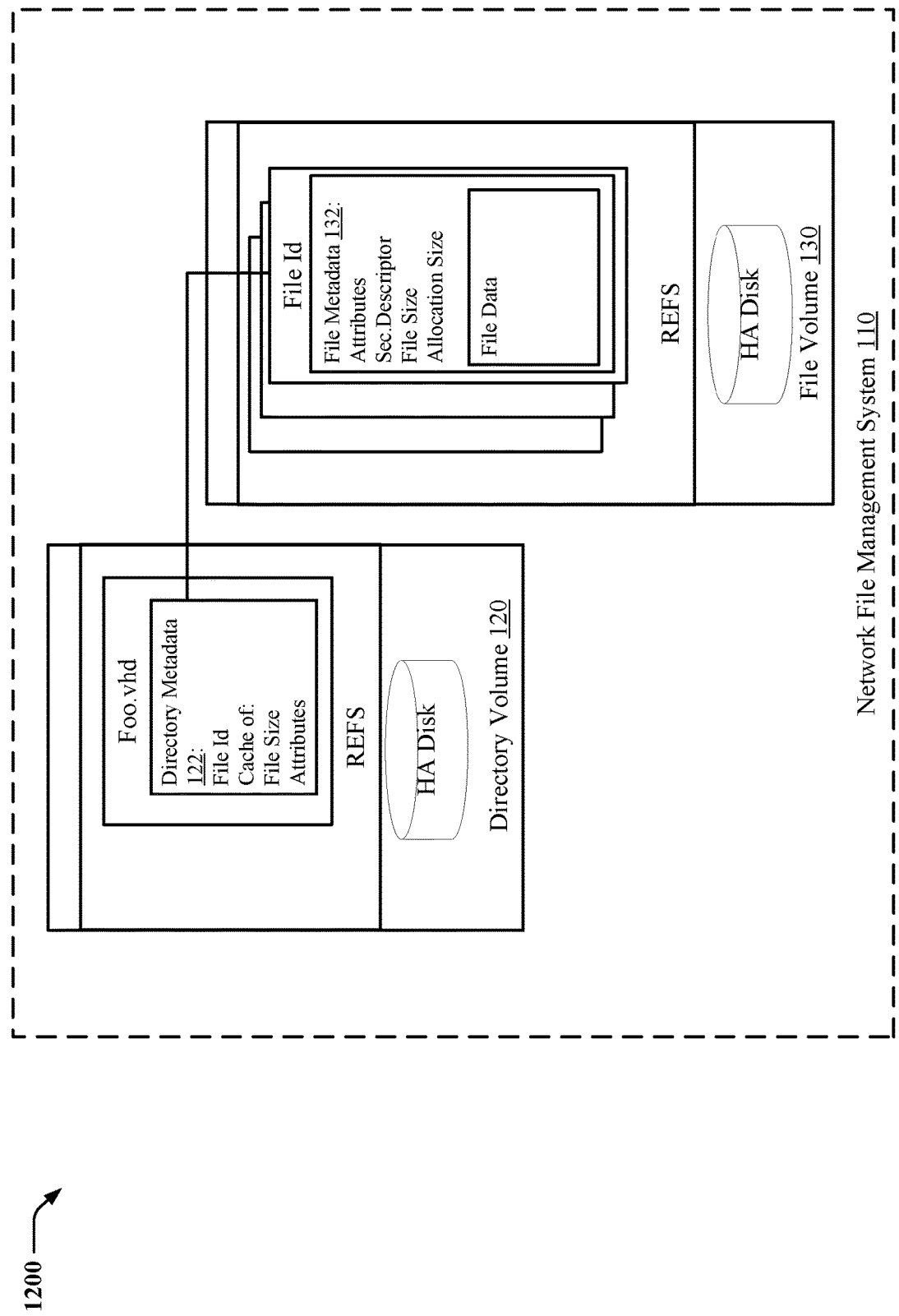
FIG. 12 is conceptual diagram of file metadata location at a two tier volume storage structure corresponding to the file load balancing scheme in accordance with one or more implementations of the present disclosure.

Referring now to FIG. 12, the two-tier volume storage structure may include a hierarchical representation 1200 of the network file management system 110. At a first tier, the directory volume 120 may include the directory metadata 122 used for accessing the file metadata 132 at the corresponding file volume 130. For example, using at least the file identifier of the file metadata 132, a location of the file metadata 132 at the file volume 130 may be determined based on the directory metadata 122. At a second tier, the file volume 130 may include the file metadata 132 used for accessing the file data. For instance, the file metadata 132 at the file volume 130 may include at least one or more attributes, a security descriptor, a file size, and/or an allocation size.

Figure 13:
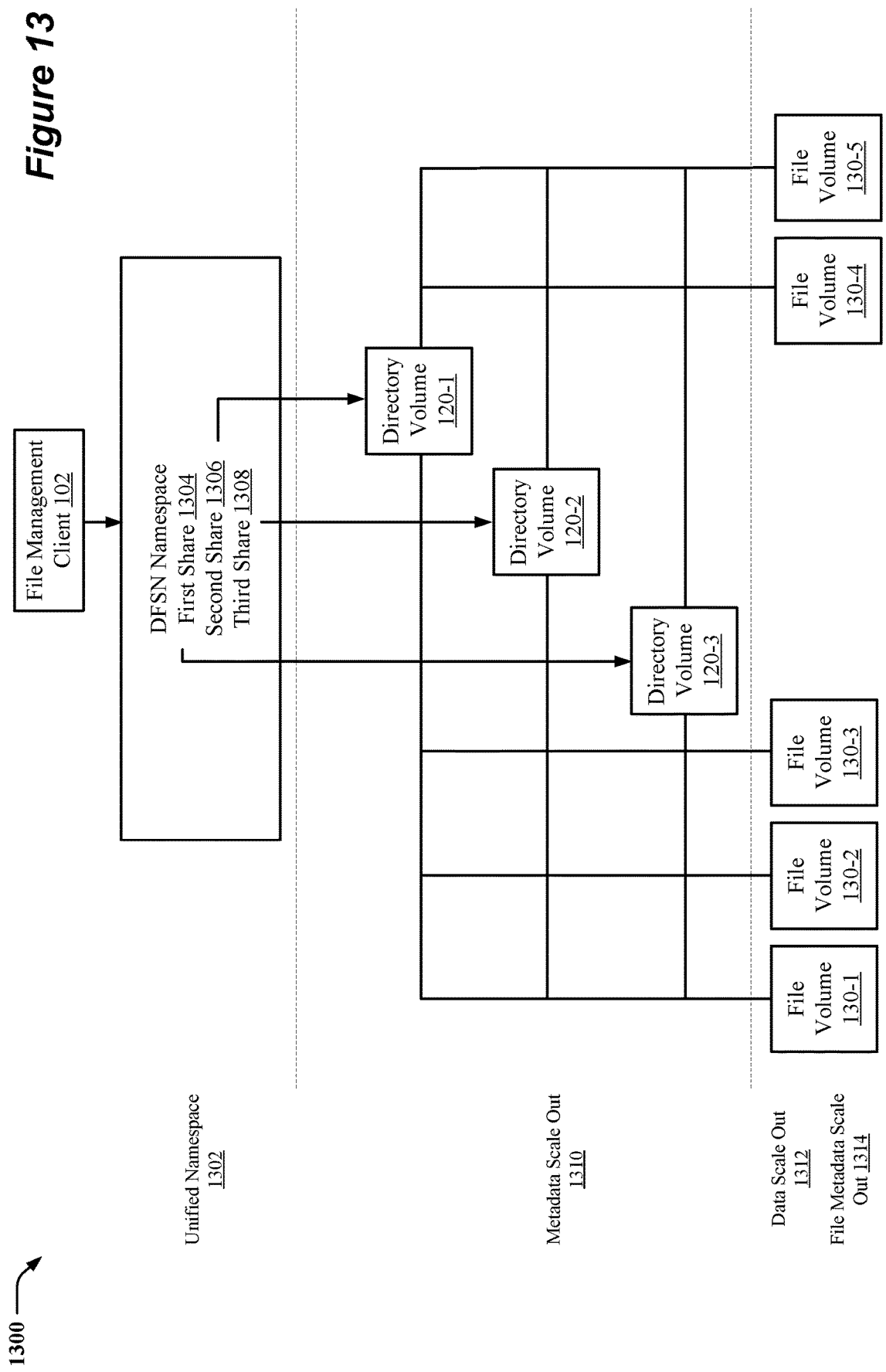
FIG. 13 is a block diagram of scale out of the file load balancing scheme in accordance with one or more implementations of the present disclosure.

Referring now to FIG. 13, a two-tier volume storage structure scale out 1300 of the file load balancing scheme 900 may provide efficient scaling of individual tiers in an independent manner. For instance, the two-tier scale out may require at least two open actions/events before an application can read and/or write data regardless of a number of volumes in each tier/layer.

Specifically, a unified namespace 1302 may provide access to multiple shares and/or directory volumes under a single file server name. The metadata scale out 1310 may include scaling of the directory volumes 120-1 to 12-3, each of which may be associated with a respective one of a first share 1304, second share 1306, or third share 1308. For example, the directory metadata scale out 1310 may be implemented by adding additional directory volumes to the existing directory volumes 120-1, 120-2, and 120-3, and associating each additional directory volume to the unified namespace 1302. In some implementations, adding a new or additional share may implicitly add an additional directory volume. Further, adding additional directory volumes may assist with scaling directory metadata IOPs by spreading them across multiple disks, and also helps with scaling directory metadata file cache across multiple nodes. Moreover, multiple directory volumes 120 may share the same pool of file volumes 130 and shard volumes 140 providing one pool of free space.

The file metadata scale out 1314 and the data scale out 1312 may include providing additional file volumes to the existing file volumes 130-1 to 130-5 and associating each additional file volume with at least one existing directory volume 120-1, 120-3, or 120-3, or an additional directory volume. In some implementations, if file metadata 132 updates/reads results in a bottleneck, then additional file volumes may be added to scale out. Adding file volumes 130 may assist with scaling file metadata IOPs by spreading them across multiple disks, and also helps with scaling metadata file cache across multiple nodes. Adding file volumes 130 may also assist with help increasing total data TOPS and bandwidth by load balancing data across multiple disks. Further, a single file volume 130 can host data from multiple directory volumes 120.

Figure 14:
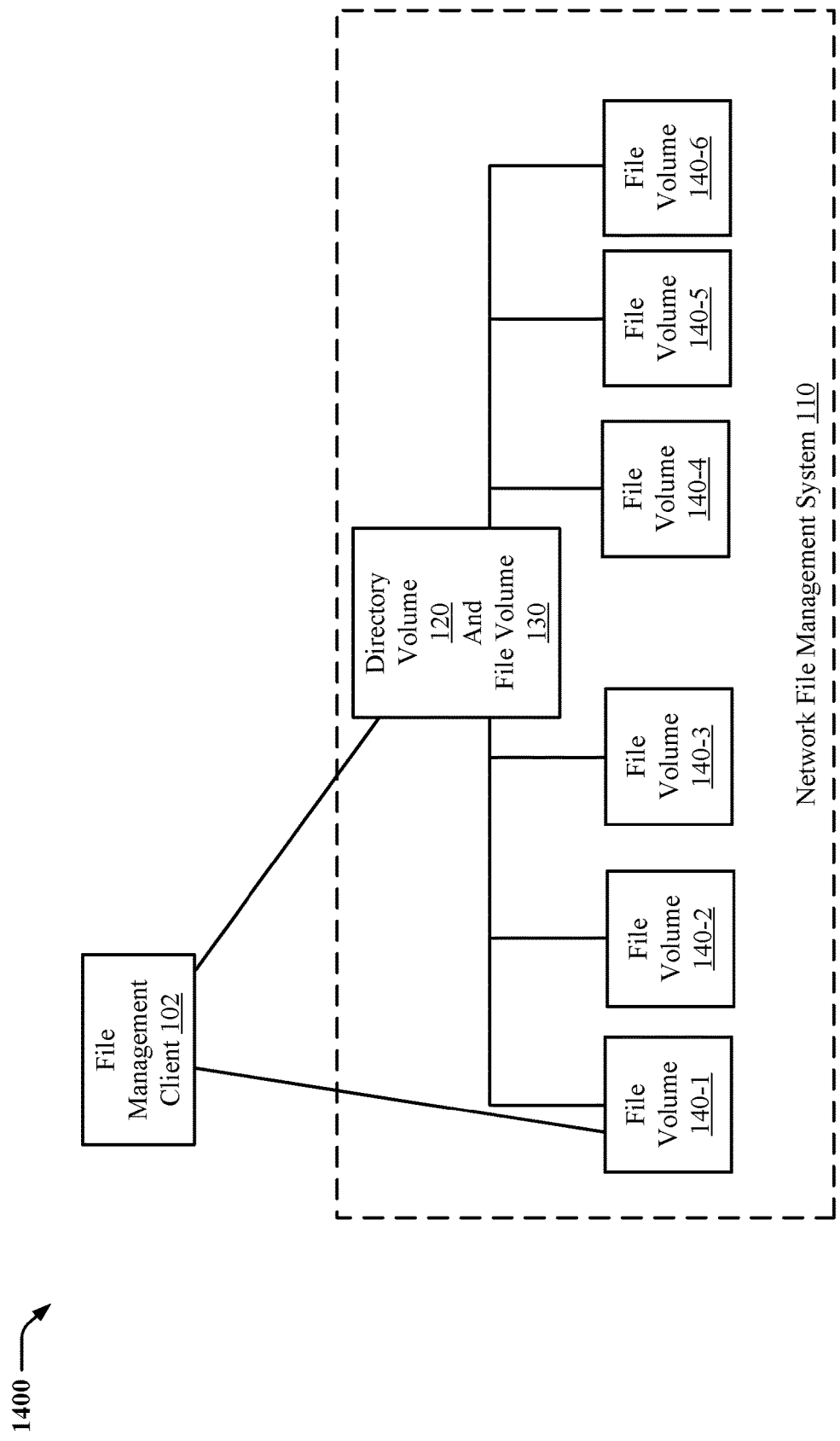
FIG. 14 is a block diagram of a file sharding balancing scheme in accordance with one or more implementations of the present disclosure.

Referring now to FIG. 14, a file data sharding scheme 1400 may provide a two-tier volume storage structure for the network file management system 110. The file data sharding scheme 1400 may separate directory metadata 122 and file metadata 132 from file data, and may shard the file data. In other words, the directory metadata 122 and the file metadata 132 may be stored or maintained on a same volume, and the file data of the one or more data files 112 may be on a different volume (e.g., file volume 130). For example, by co-locating the directory volume 120 and the file volume 130, the file data sharding scheme 1400 may have a minimum impact on file opens (e.g., only two opens to access data on a given file). Further, as the directory metadata 122 and the file metadata 132 are also co-located, they may also scale together.

For example, the co-located directory volume 120 and file volume 130 may be configured to store both the directory metadata 122 and file metadata 132. Specifically, the co-located directory volume 120 and file volume 130 may store, for each file, file names, organize files into directories, enforce quotas (e.g., related to disk storage space), and may be considered a master store of information about the file. Further, the co-located directory volume 120 and file volume 130 may be configured to store, for each file, the file identifier, persistent reference count, file size, file security descriptor, shards table, file attributes such as, but not limited to FILE_ATTRIBUTE_READONLY, FILE_ATTRIBUTE_ARCHIVE, FILE_ATTRIBUTE_COMPRESSED, FILE_ATTRIBUTE_INTEGRITY_STREAM, FILE_ATTRIBUTE_NO_SCRUB_DATA, and FILE_ATTRIBUTE_SPARSE_FILE, timestamps including at least one of create time, last access time, and/or last modification time. The co-located directory volume 120 and file volume 130 may place and rebalance file shards across data or shard volumes 140-1 to 14-6, may support file sharing, may provide an advisory byte range locks and/or Oplocks to support directory metadata 122 and file metadata 132 caching on the client.

The one or more shard volumes 140-1 to 140-6 may be configured to provide storage for the shards 142 or partitioned data from the one or more data files 112. For instance, the one or more shard volumes 140-1 to 140-6 may provide available (free) space for the one or more co-located directory volumes 120 and file volumes 130 to store the shards 142 or partitioned data from the one or more data files 112. The VDL may be tracked for each shard 142. Further, the one or more shard volumes 140-1 to 140-6 may be aware of at least one file attribute including, but not limited to, FILE_ATTRIBUTE_READONLY, FILE_ATTRIBUTE_ARCHIVE, FILE_ATTRIBUTE_COMPRESSED, FILE_ATTRIBUTE_INTEGRITY_STREAM, FILE_ATTRIBUTE_NO_SCRUB_DATA, and FILE_ATTRIBUTE_SPARSE_FILE. The one or more shard volumes 140-1 to 140-6 may include mandatory byte range locks and/or Oplocks to back data cache on the client.

Figure 15:
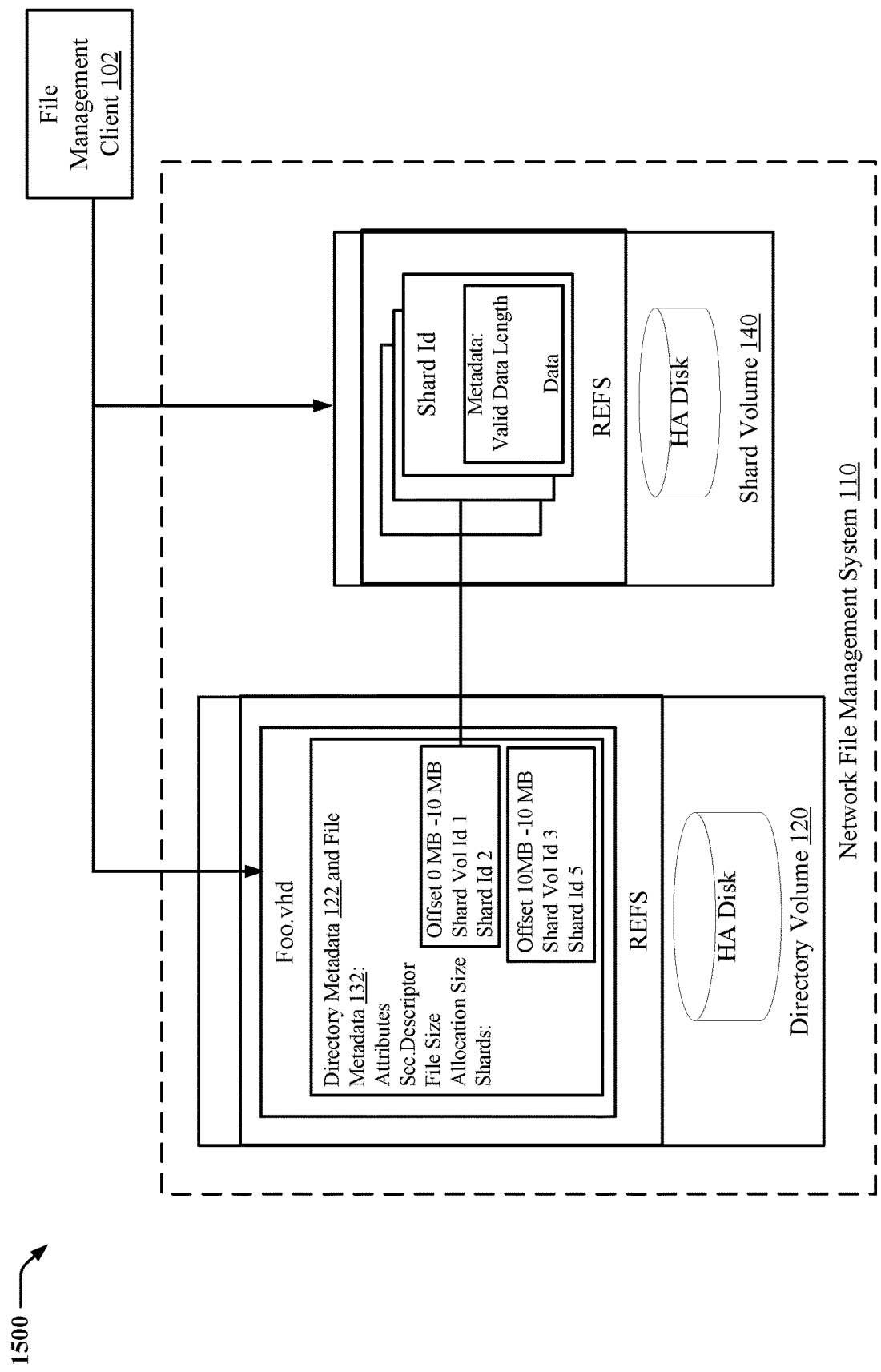
FIG. 15 is a block diagram of a two tier volume storage structure corresponding to the file sharding scheme in accordance with one or more implementations of the present disclosure.

Referring now to FIG. 15, a two tier volume storage structure 1500 corresponding to the file sharding scheme 1400 may include the network file management system 110. Each tier, which may include one or more volumes, may include one or more REFS roles. For example, at the co-located directory volume 120 and file volume 130 (e.g., first tier), REFS may implement a user visible directory structure which may be used when handling a number of file operations including, but not limited to, open, rename, delete, close, and/or when propagating the file metadata 132 from the file volume 130 to the directory cache.

Further, at the shard volume 140 (e.g., second tier), REFS may correspond to a sub-locator that assists to allocate and manage shards 142 on a disk, rather than writing or implementing a separate or distinct allocator that would subdivide disk space to shards 142. Moreover, accessing shards 142 as files may provide a convenient file interface that may be used for cutting access to the storage on layout revocation by invalidating existing file opens, deleting the file during garbage collection of unused shards 142 and/or relying on REFS to lazily grow a file or files that represent the shard 142 as application writes to the shard 142.

As an example, to read/write data on the network file management system 110, the file management client 102 may open the file (e.g., Foo.vhd) on the co-located directory volume 120 and file volume 130 (e.g., which may correspond to a directory server) and query shards layout including the shard volumes that store the one or more shards 142. For each shard, the file management client 102 may open the shard on a shard volume 140 and perform read and/or write operations. The above example may include one open instance to obtain the shard layout, and another open instance for each file shard.

Figure 16:
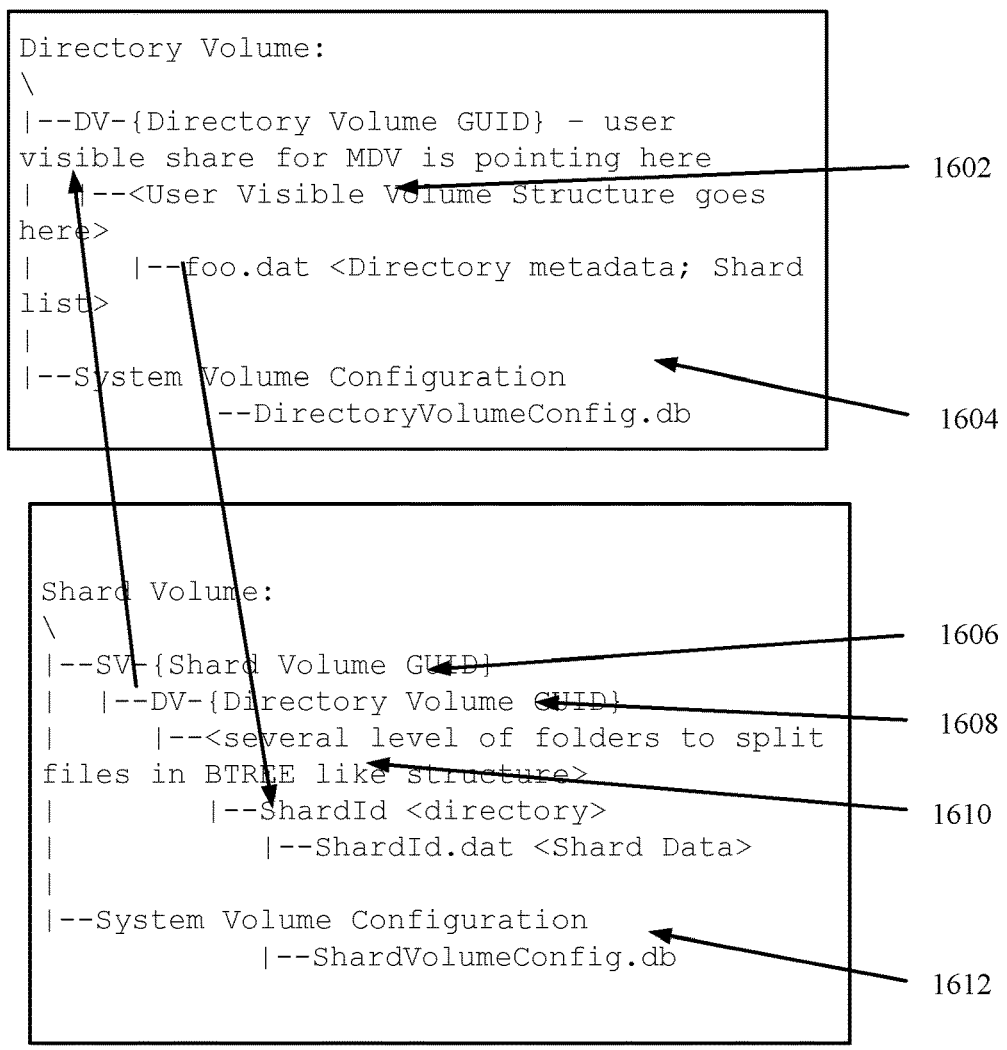
FIG. 16 is an example physical volume directory layout of the file sharding scheme in accordance with one or more implementations of the present disclosure.

Referring now to FIG. 16, an example physical volume directory layout 1600 of the file sharding scheme 1400 may lay out logical entities such as the directory volume 120 and the shard volume 140 on top of a physical entity (e.g., physical volume). The physical volume directory layout 500 may define bindings of the logical entities between each other (e.g., between directory volume 120 and shard volume 140).

For example, at 1602, every directory volume 120 may have a distinct or independent directory so as to permit collocating multiple roles on the same physical volume. At 1604, directory volume(s) 120 hosted by the physical volume may be defined, and bindings between the directory volume(s) 120 and shard volume(s) 140 may be included. Directory volume file system mini-filter may attach to the volume if the physical volume contains any directory volume(s) 120.

At 1606, every shard volume 140 may have a distinct or independent directory to permit collocation of multiple roles on the same physical volume. At 1608, every directory volume 120 may have a distinct or independent directory to allow quick location all files placed by the given directory volume 120. At 1610, file to directory ratio may be controlled. At 1612, Defines shard volume(s) hosted by the physical volume may be defined, and bindings between these shard volume(s) 140 and directory volume(s) 120 may be included. Shard volume file system mini-filter may attach to the volume if the physical volume contains any shard volume(s) 140. In some implementations, a single physical volume can contain multiple logical directory volume(s) 120. Further, each directory volume 120 can be associated with multiple file volume(s) 130.

Figure 17:
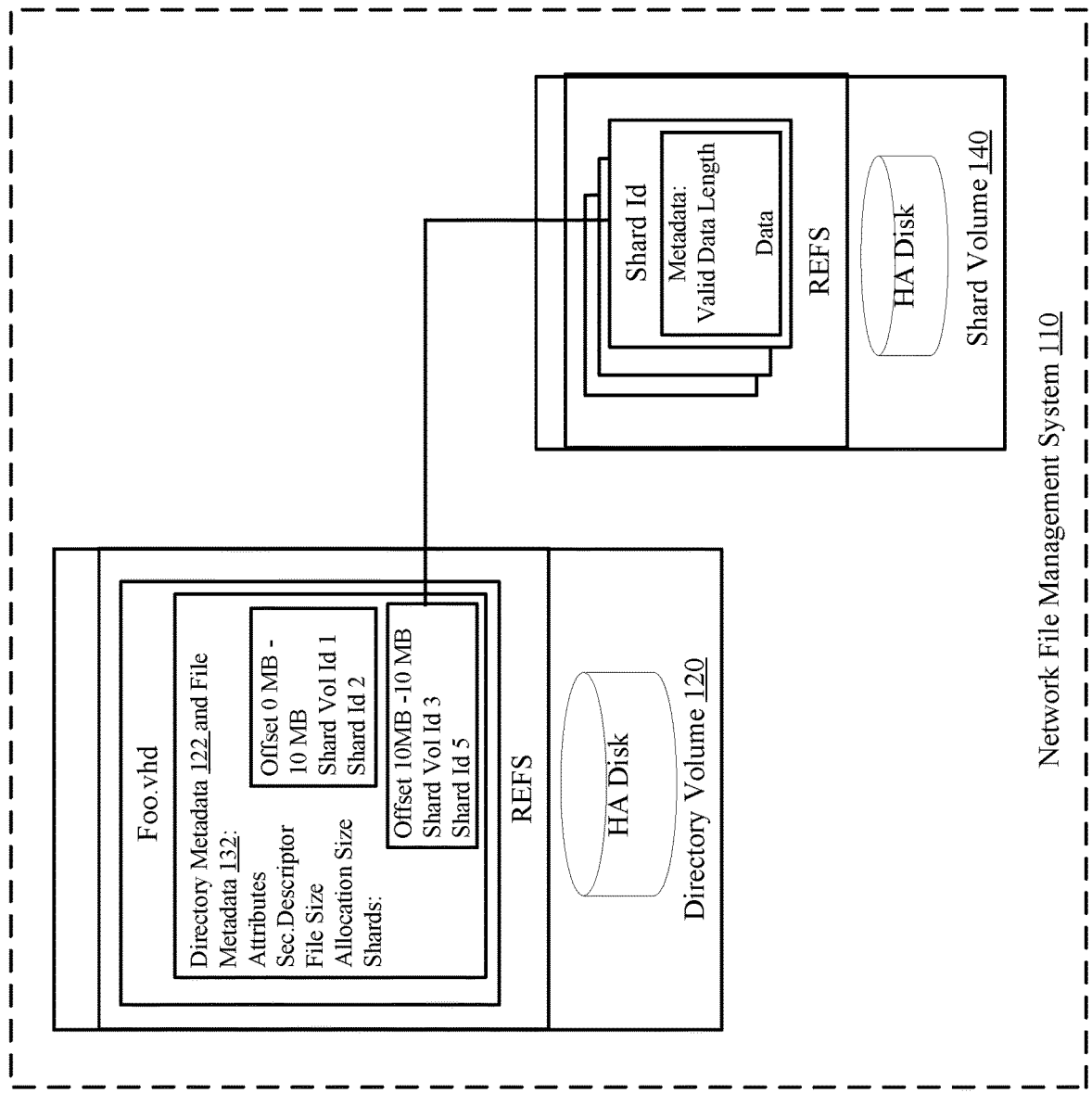
FIG. 17 is conceptual diagram of file metadata location at a two tier volume storage structure corresponding to the file sharding scheme in accordance with one or more implementations of the present disclosure.

Referring now to FIG. 17, a file metadata location at a two tier volume storage structure corresponding to the file sharding scheme 1400. The two-tier volume storage structure may include a hierarchical representation 1700 of the network file management system 110. At a first tier, the co-located directory volume 120 and file volume 130 may include the directory metadata 122 and file metadata 132 used for accessing the one or more shards 142 storing the file data. For instance, the file metadata 132 at the file volume 130 may include at least a shard volume identifier that identifies the shard volume 140 storing the file data, or shards 142, and the location of the one or more shards 142 within the shard volume 140 containing the file data based on a shard identifier. At a second tier, the shard volume 140 may include the one or more shards 142 storing the file data/content.

Figure 18:
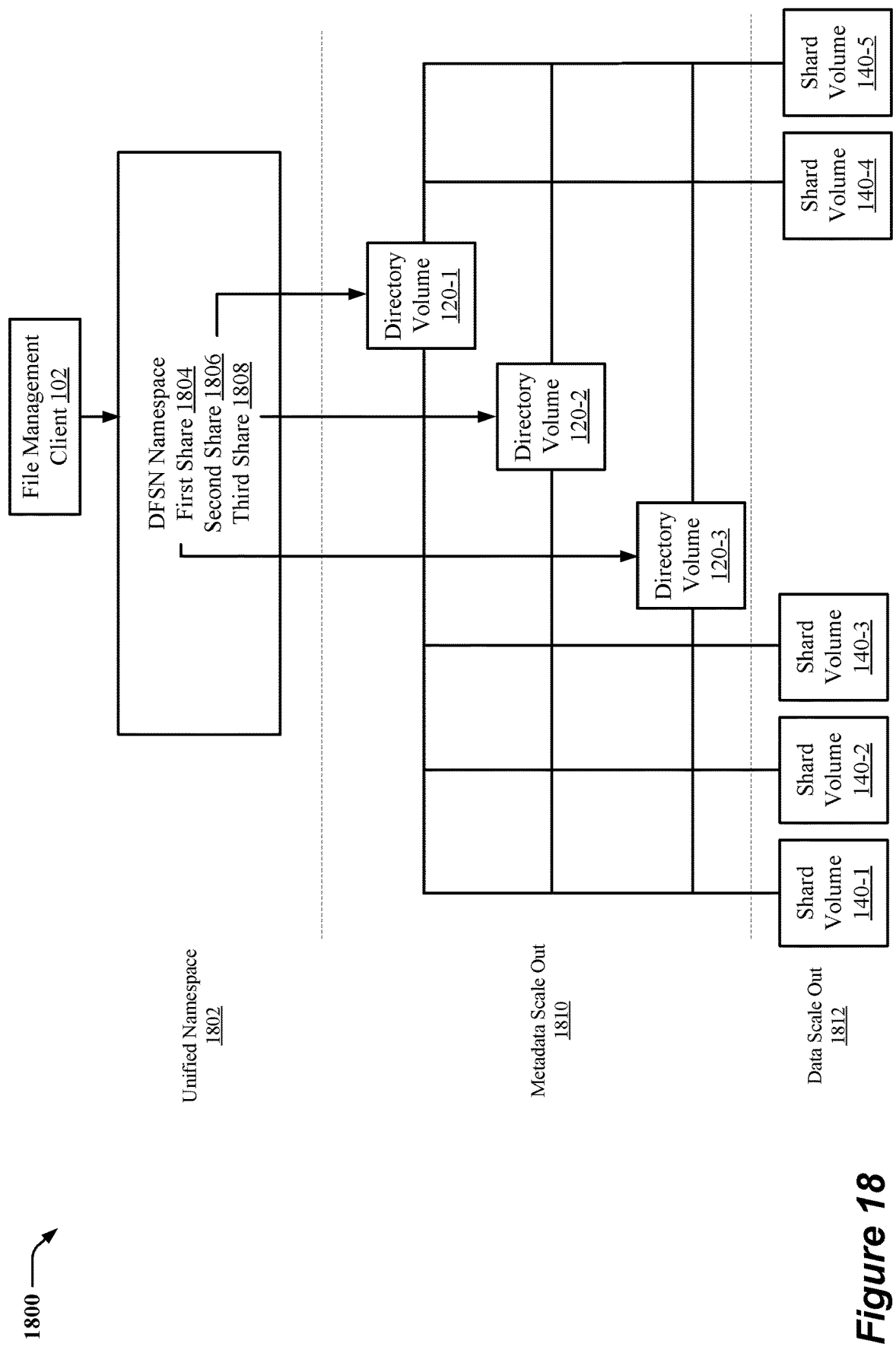
FIG. 18 is a block diagram of scale out of the file sharding scheme in accordance with one or more implementations of the present disclosure.

Referring now to FIG. 18, a two-tier volume storage scale out 1800 of the file sharding scheme 1400 may provide efficient scaling of individual tiers in an independent manner. For instance, scaling tiers or layers may not increase latency as the two-tier scale out may require at least two open actions/events before an application can read and/or write data regardless of a number of volumes in each tier/layer (e.g., each shard, however, requires a separate open instance).

Specifically, a unified namespace 1802 may provide access to multiple shares and/or directory volumes under a single file server name. The metadata scale out 1310 may include scaling of the directory volumes 120-1 to 120-3, each of which may be associated with a respective one of a first share 1304, second share 1306, or third share 1308. For example, the metadata scale out 1810 may be implemented by adding additional directory volumes to the existing directory volumes 120-1, 120-2, and 120-3, and associating each additional directory volume to the unified namespace 1302. In some implementations, adding a new or additional share may implicitly add an additional directory volume. Further, adding additional directory volumes may assist with scaling directory metadata IOPs by spreading them across multiple disks, and also helps with scaling directory metadata file cache across multiple nodes. Moreover, multiple directory volumes 120 may share the same pool of file volumes 130 and shard volumes 140 providing one pool of free space.

Further, the data scale out 1812 may include providing additional shard volumes to the existing shard volumes 140-1 to 140-5. In some implementations, if free space falls below a defined level, or if additional IOPS/bandwidth are needed, then additional shard volumes 140 may be added.

Figure 19:
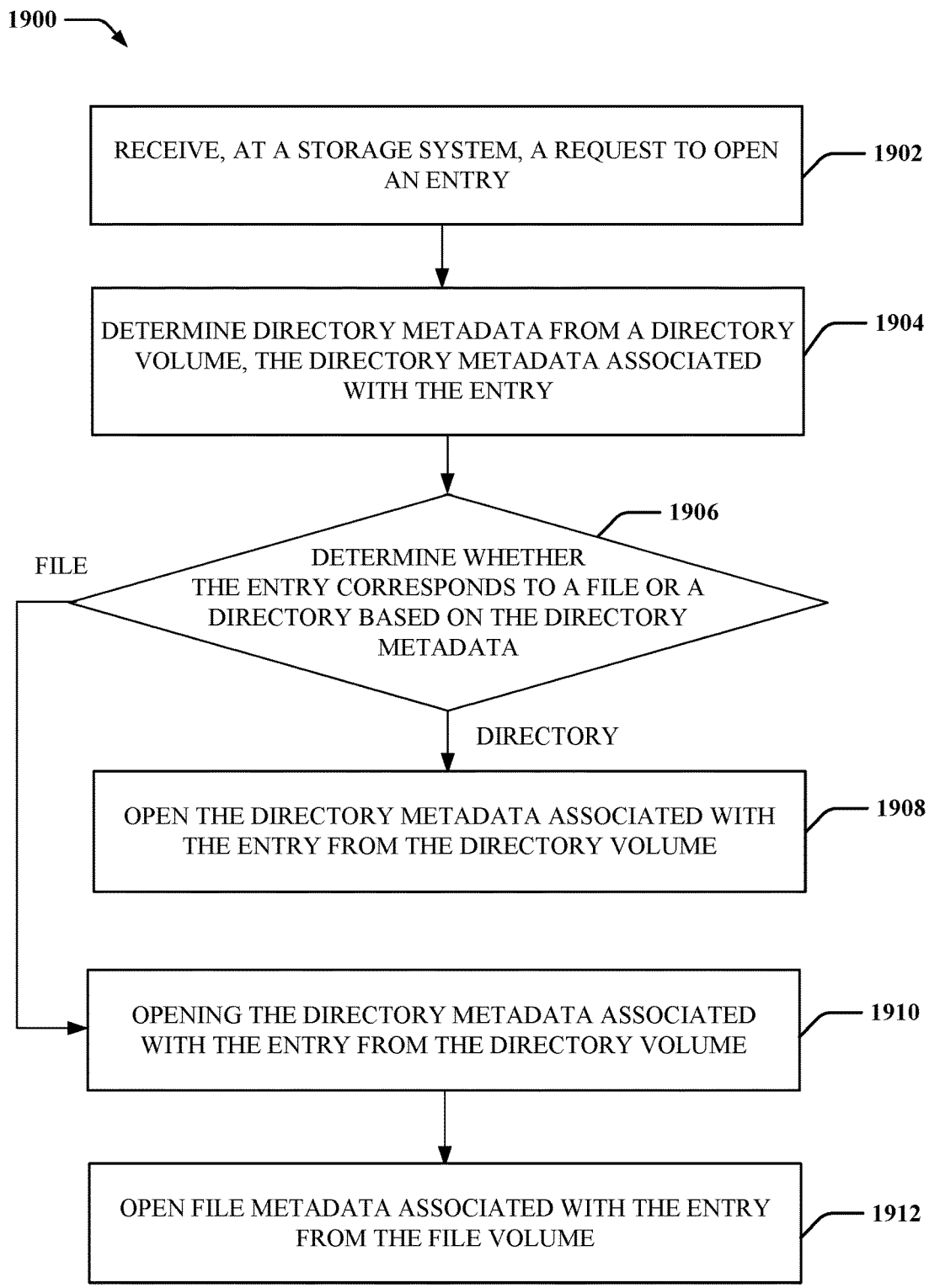
FIG. 19 is a flow chart of a method of opening an entry within a multi-tier volume storage structure in accordance with an implementation of the present disclosure.

Referring now to FIG. 19, an example method 1900 for opening an entry at the network file management system 110. The actions illustrated in method 1900 may overlap in time. For example, at an instant in time, two of the actions may be performed by different components. The execution of the actions may also be interleaved on a component. Additionally, the actions illustrated in method 1900 may be performed in an order other than illustrated in FIG. 19.

At block 1902, the method 1900 may receive, at a storage system, a request to open an entry. For example, as described herein, the network file management system 110 may receive, at the directory volume 120, a request to open entry. In some implementations, the entry may correspond to either a file or a directory in the network file management system 110. In some implementations, the directory volume 120 may store directory metadata 122 associated with the one or more data files 112.

At block 1904, the method 1900 may determine directory metadata from a directory volume, the directory metadata associated with the entry. For instance, as described herein, the network file management system 110 may determine directory metadata 122 from a directory volume 120, the directory metadata 122 may be associated with the entry.

At block 1906, the method 1900 may determine whether the entry corresponds to a file or a directory based on the directory metadata. For instance, as described herein, the network file management system 110 may determine whether the entry corresponds to a file or a directory based on the directory metadata 122.

At block 1908, the method 1900 may open the directory metadata associated with the entry from the directory volume based on a determination that the entry corresponds to a directory. For instance, as described herein, the network file management system 110 may open the directory metadata 122 associated with the entry from the directory volume 120.

At block 1910, the method 1900 may open the directory metadata associated with the entry from the directory volume based on a determination that the entry does corresponds to a file. For instance, as described herein, the network file management system 110 may open the directory metadata 122 associated with the entry from the directory volume 120.

At block 1912, the method 1900 may open file metadata associated with the entry from the file volume. For instance, as described herein, the network file management system 110 may open file metadata 132 associated with the entry from the file volume 130. In some implementations, the file volume 130 may store the file metadata 132 associated with the file of the one or more data files 112.

Although not shown, the method 1900 may further determine a shard volume identifier and one or more shard identifiers associated with the file based on the file metadata 132, identify a shard volume 140 based on the shard volume identifier, and access one or more shards using the one or more shard identifiers at the shard volume 140 to access the file.

In some implementations, the directory volume 120, the file volume 130, and the shard volume 140 may be separate volumes forming a three tier hierarchical structure. In some implementations, the file volume 130 and the shard volume 140 may be co-located at a same volume, separate from the directory volume 120, and forming a two tier structure. In some implementations, the file metadata 132 and the file data are stored at the same volume.

In some implementations, the directory volume 120 and the file volume 130 may be co-located at a same volume, separate from the shard volume 140, and form a two tier structure. In some implementations, the directory metadata 122 and the file metadata 132 are stored at the same volume.

In some implementations, the directory volume 120 may provide a user visible directory structure, and the directory metadata 122 may include at least one of the file identifier, a cache of a file size, or a cache of at least one file attribute.

In some implementations, the file volume 130 may maintain the file metadata 132 associated with one or more data files 112 including the file and file shard assignments, and the file metadata 132 may include at least one of the file identifier, a file size, a file security descriptor, a shard table including at least a shard volume identifier and an individual shard identifier, or at least one file attribute.

In some implementations, the shard volume 140 may provide storage area to one or more linked file volumes 130, and the file data includes at least one of a shard identifier, a valid data length, or written data.

In some implementations, each of the one or more shards 142 may correspond to a fixed size storage area, and the fixed size may correspond to at least one of a uniform size across each of the one or more shards 142 at the shard volume 140 or a varying size across each of the one or more shards 142 at the shard volume 140.

In some implementations, the file volume 130 may be associated with an additional volume forming a set of file volumes (e.g., 130-1 to 130-N) both associated with the directory volume 120. Further, in some implementations, although not shown, the method 1900 may include grouping the file volume 130 and the additional file volume using a hash function supporting load balancing of a set of files (e.g., one or more data files 112) including the file.

In some implementations, the file volume 130 and the shard volume 140 may be accessible by the directory volume 120 and at least one other directory volume (e.g., 120-N). In some implementations, the directory volume 120 may provide access to two or more distinct file volumes including the file volume (e.g., file volume 130-1 and 130-N). In some implementations, the file volume 130 may provide access to two or more distinct shard volumes including the shard volume (e.g., shard volumes 140-1 and 140-N).

Figure 20:
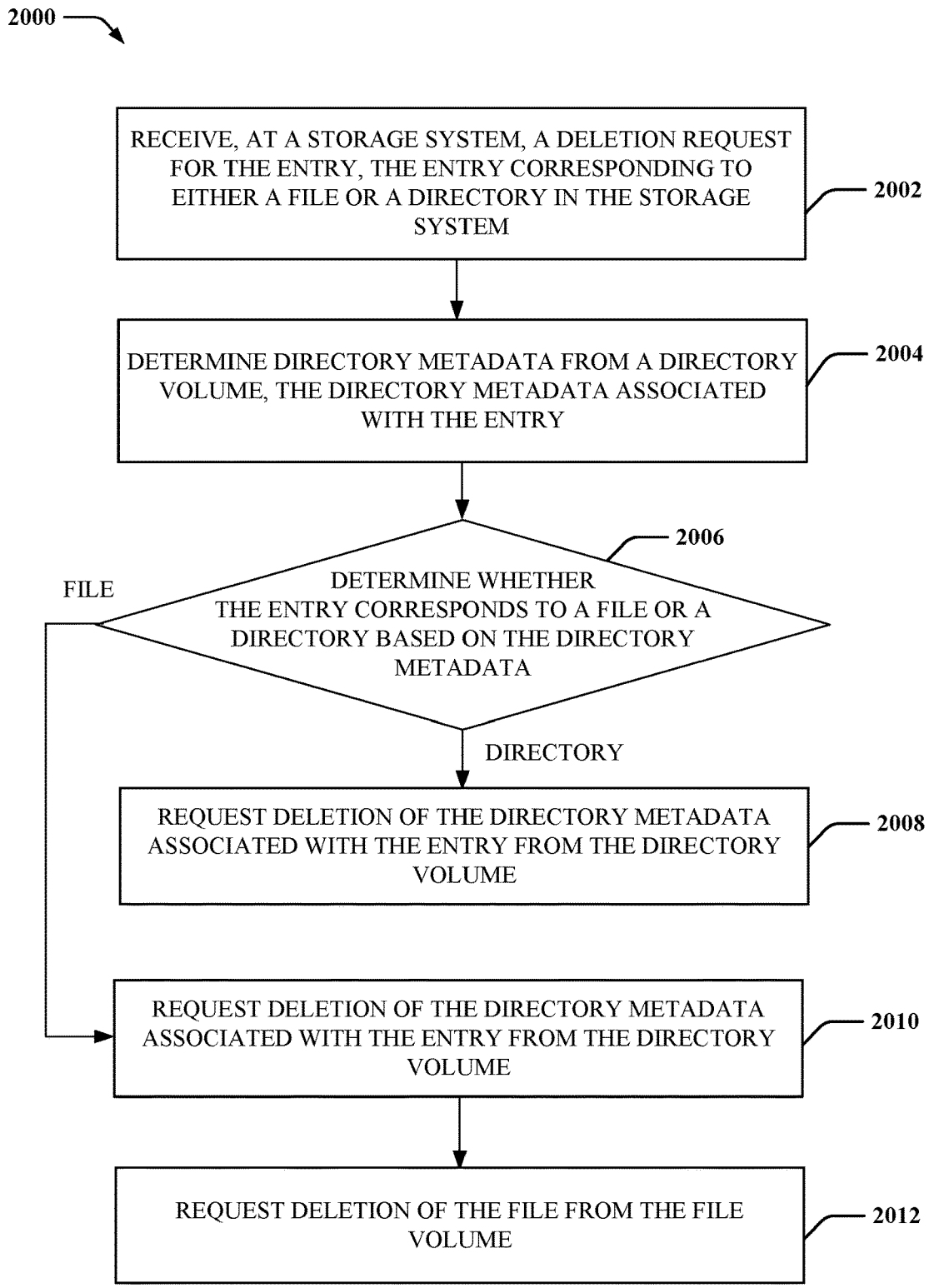
FIG. 20 is a flow chart of a method of deleting an entry within a multi-tier volume storage structure in accordance with an implementation of the present disclosure.

Referring now to FIG. 20, an example method 2000 for deleting an entry at the network file management system 110. The actions illustrated in method 2000 may overlap in time. For example, at an instant in time, two of the actions may be performed by different components. The execution of the actions may also be interleaved on a component. Additionally, the actions illustrated in method 2000 may be performed in an order other than illustrated in FIG. 20.

At block 2002, the method 2000 may receive, at the storage system, a deletion request for the entry, the entry corresponding to either a file or a directory in the storage system. For example, as described herein, the network file management system 110 may receive a deletion request for the entry, the entry corresponding to either a file or a directory in the storage system.

At block 2004, the method 2000 may determine directory metadata from a directory volume, the directory metadata associated with the entry. For example, as described herein, the network file management system 110 may determine directory metadata 122 from a directory volume 120, the directory metadata 122 associated with the entry.

At block 2006, the method 2000 may determining whether the entry corresponds to the file or the directory based on the directory metadata. For example, as described herein, the network file management system 110 may determining whether the entry corresponds to the file or the directory based on the directory metadata 122.

At block 2008, the method 2000 may request deletion of the directory metadata associated with the entry from the directory volume based on a determination that the entry corresponds to the directory. For example, as described herein, the network file management system 110 may request deletion of the directory metadata 122 associated with the entry from the directory volume 120.

At block 2010, the method 2000 may request deletion of the directory metadata associated with the entry from the directory volume based on a determination that the entry corresponds to the file. For example, as described herein, the network file management system 110 may request deletion of the directory metadata 122 associated with the entry from the directory volume 120.

At block 2012, the method 2000 may request deletion of the file from the file volume. For example, as described herein, the network file management system 110 may request deletion of the file from the file volume 130 based on a determination that the entry corresponds to the file.

In some implementations, requesting deletion of the directory metadata 122 may include one or more actions selected from the group consisting of marking the directory metadata 122 associated with the entry as invalid, marking the directory metadata 122 associated with the entry as deleted, overwriting the directory metadata 122 associated with the entry, storing, within a persistent queue, the deletion request for the entry, storing, within a persistent queue, the directory metadata 122 associated with the entry, removing the directory metadata 122 associated with the entry from a tracking structure associated with the directory containing the entry, and decrementing a reference count for the directory metadata 122.

In some implementations, although not shown, based on the determination that the entry corresponds to the file, the method 2000 may include determining, based on the directory metadata 122, the file volume 130 containing file metadata 132 for the file, the file metadata 132 comprising a shard identifier identifying at least a portion of the file data for the file within a shard volume 140, requesting deletion of the file metadata 132 from the file volume 130, and requesting deletion of the shard identifier from the shard volume 140.

In some implementations, based on the determination that the entry corresponds to the file, requesting deletion of the file from the file volume 140 may include storing, within a persistent queue, a queue entry, the queue entry comprising at least one of the deletion request for the entry, the directory metadata 122 associated with the entry, or a file identifier corresponding to the file, determining, based on the persistent queue including the queue entry, a file metadata 132 associated with the file, the file metadata 132 comprising a shard volume identifier and an individual shard identifier, and requesting deletion of the individual shard identifier from the shard volume 140 based on the shard volume identifier.

In some implementations, the file volume 130 may include file metadata 132 associated with the file, and the file metadata 132 may include a file size and a shard identifier within a shard volume. In some implementations, the shard volume 140 may include shard metadata corresponding to the shard identifier, the shard metadata comprising a valid data length for the shard.

In some implementations, the file metadata 132 may include a maximum data length for the shard, the valid data length for the shard being less than the corresponding maximum data length.

In some implementations, the file metadata 132 may include an allocated data length for the shard, the valid data length for the shard being less than the corresponding allocated data length In some implementations, based on a determination that the entry corresponds to the file, although not shown, the method 2000 may include deleting the directory metadata 122 from the directory volume 120, and determining completion of the deletion request based on deleting the directory metadata 122 from the directory volume 120 and irrespective of a pending request to delete the file from the file volume 130.

Figure 21:
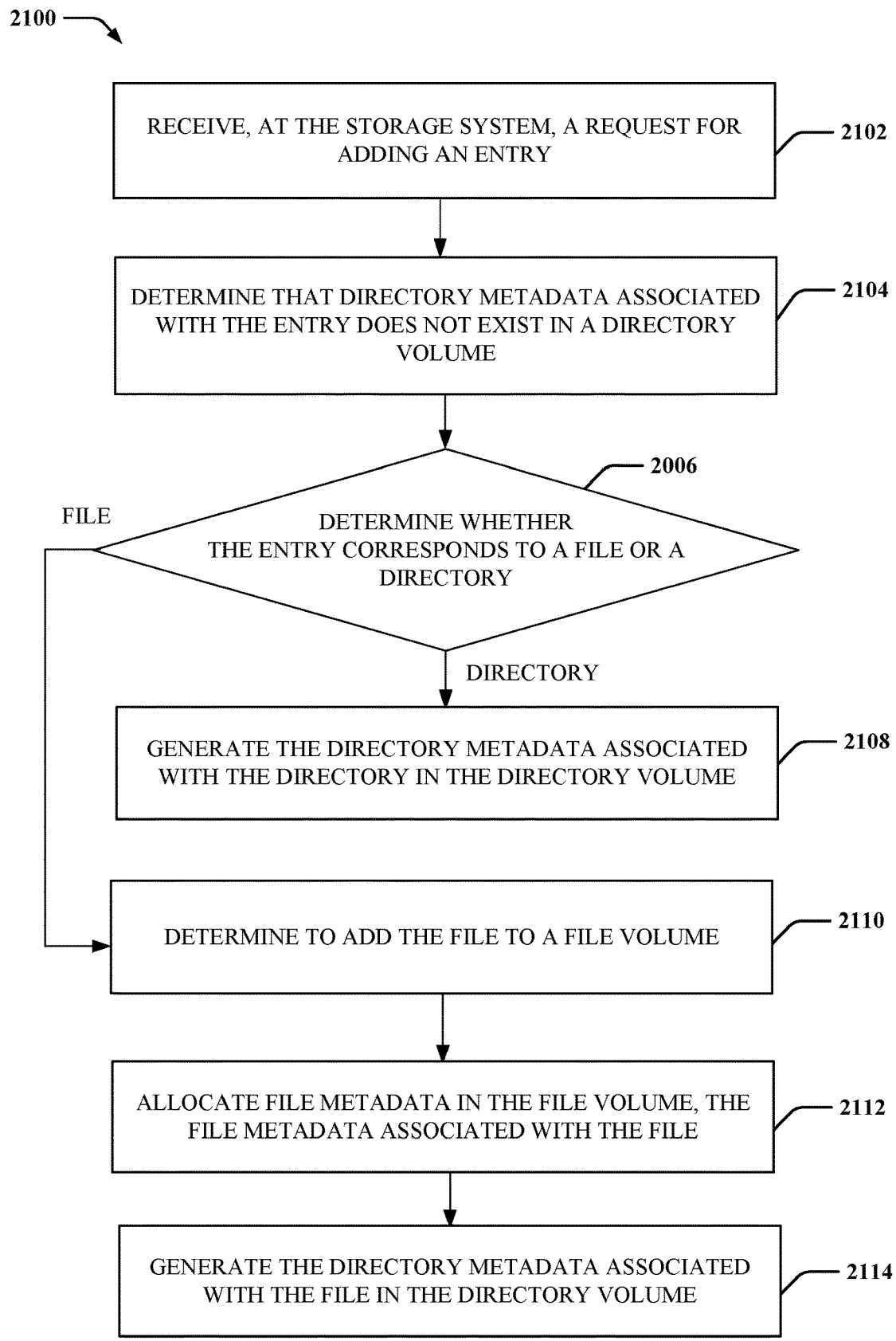
FIG. 21 is a flow chart of a method of adding an entry within a multi-tier volume storage structure in accordance with an implementation of the present disclosure.

Referring now to FIG. 21, an example method 2100 for adding an entry to the network file management system 110. The actions illustrated in method 2100 may overlap in time. For example, at an instant in time, two of the actions may be performed by different components. The execution of the actions may also be interleaved on a component. Additionally, the actions illustrated in method 2100 may be performed in an order other than illustrated in FIG. 21.

At block 2102, the method 2100 may receive, at the storage system, a request for adding the entry. For example, as described herein, the network file management system 110 may receive, at the storage system, a request for adding the entry.

At block 2104, the method 2100 may determine that directory metadata associated with the entry does not exist in a directory volume. For example, as described herein, the network file management system 110 may determine that directory metadata 122 associated with the entry does not exist in a directory volume 120.

At block 2106, the method 2100 may determine whether the entry corresponds to a file or a directory. For example, as described herein, the network file management system 110 may determine whether the entry corresponds to the file or the directory.

At block 2108, the method 2100 may generate the directory metadata associated with the directory in the directory volume based on a determination that the entry corresponds to the directory. For example, as described herein, the network file management system 110 may generate the directory metadata 122 associated with the directory in the directory volume 120.

At block 2110, the method 2100 may determine to add the file to a file volume. For example, as described herein, the network file management system 110 may determine to add the file to a file volume 130.

At block 2112, the method 2100 may allocate file metadata in the file volume, the file metadata associated with the file. For example, as described herein, the network file management system 110 may allocate file metadata 132 in the file volume 130, the file metadata 132 associated with the file.

At block 2114, the method 2100 may generate the directory metadata associated with the file in the directory volume. For example, as described herein, the network file management system 110 may generate the directory metadata 122 associated with the file in the directory volume 120. In some implementations, the directory metadata 122 may include an identifier of the file metadata 132.

In some implementations, based on the determination that the entry corresponds to the file, the directory metadata 122 may include an identifier for the allocated file metadata 132.

In some implementations, based on the determination that the entry corresponds to the file, although not shown, the method 2100 may include determining a shard volume 140 to store data for the file as one or more shards 142, and adding the data for the file to the shard volume 140 as one or more shards 142.

In some implementations, the file metadata 132 may include a shard volume identifier identifying the shard volume 140, and a shard identifier associated with each of the one or more shards 142 and identifying the file within the shard volume 140.

In some implementations, determining to add the file to the file volume 130 may include identifying at least one of the file volume 130 within a group of file volumes or the shard volume 140 within a group of shard volumes based on load information.

In some implementations, although not shown, the method 2100 may include reallocating the one or more shards 142 across to another shard volume 140 within the group of shard volumes based on the load information.

Figure 22:
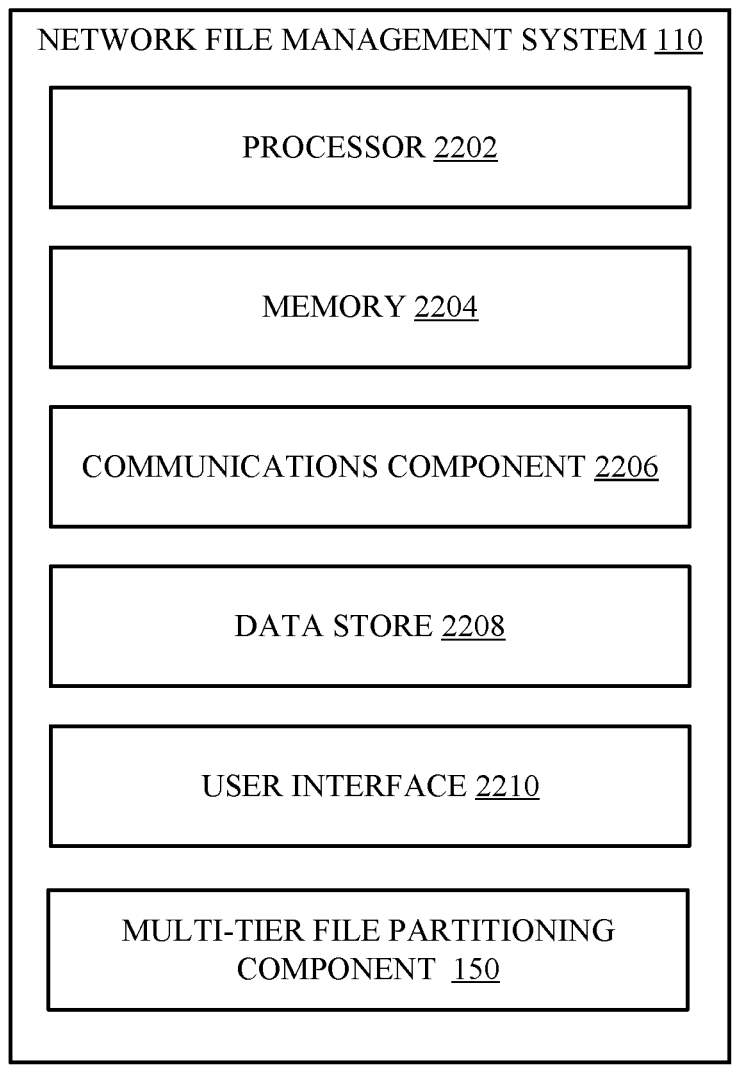
FIG. 22 is a schematic block diagram of an example implementation of the network file management system in accordance with an implementation of the present disclosure.

Referring now to FIG. 22, illustrated is an example network file management system 110 in accordance with an implementation, including additional component details (relative to multi-tier file partitioning component 150) as compared to FIG. 1. In one example, the network file management system 110, which may be an computer device such as a server device, may include processor 2202 for carrying out processing functions associated with one or more of components and functions described herein. Processor 2202 can include a single or multiple set of processors or multi-core processors. Moreover, processor 2202 can be implemented as an integrated processing system and/or a distributed processing system. In an implementation, for example, processor 2202 may include a CPU. In an example, the network file management system 110 may include memory 2204 for storing instructions executable by the processor 2202 for carrying out the functions described herein.

The memory 2204 may be configured for storing data and/or computer-executable instructions defining and/or associated with an operating system and/or application, and CPU may execute operating system and/or application. An example of memory can include, but is not limited to, a type of memory usable by a computer, such as random access memory (RAM), read only memory (ROM), tapes, magnetic discs, optical discs, volatile memory, non-volatile memory, and any combination thereof. Memory may store local versions of applications being executed by CPU.

The processor 2202 may be any processor specially programmed as described herein, including a controller, microcontroller, application specific integrated circuit (ASIC), field programmable gate array (FPGA), system on chip (SoC), or other programmable logic or state machine. The processor 2202 may include other processing components such as an arithmetic logic unit (ALU), registers, and a control unit. Further, the operating system may include instructions (such as one or more applications) stored in memory and executed by the CPU. The network file management system 110 may also include one or more applications including instructions stored in memory 2204 and executed by the processor 2202. Additionally, the network file management system 110 may include an operating system (not shown) that coordinates the utilization of hardware and/or software resources on the network file management system 110, as well as one or more applications that perform specialized tasks and/or provide additional functionality.

Further, the network file management system 110 may include a communications component 2206 that provides for establishing and maintaining communications with one or more parties utilizing hardware, software, and services as described herein. Communications component 2206 may carry communications between components on the network file management system 110, as well as between the network file management system 110 and external devices, such as devices located across a communications network and/or devices serially or locally connected to the network file management system 110. For example, communications component 2206 may include one or more buses, and may further include transmit chain components and receive chain components associated with a transmitter and receiver, respectively, operable for interfacing with external devices.

Additionally, the network file management system 110 may include a data store 2208, which can be any suitable combination of hardware and/or software, that provides for mass storage of information, databases, and programs employed in connection with implementations described herein. For example, data store 2208 may be a data repository for operating system and/or applications.

The network file management system 110 may also include a user interface component 2210 operable to receive inputs from a user of the network file management system 110 and further operable to generate outputs for presentation to the user. User interface component 2210 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 2210 may include one or more output devices, including but not limited to a display, a speaker, a haptic feedback mechanism, a printer, any other mechanism capable of presenting an output to a user, or any combination thereof.

In an implementation, user interface component 2210 may transmit and/or receive messages corresponding to the operation of operating system and/or application. In addition, processor 2202 executes operating system and/or application, and memory 2204 or data store 2208 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A tiered storage system that separates storage of directory metadata, file metadata, and shard data on volumes for scalability of independent tiers and that adds an entry for a file, comprising:
    a memory configured to store data; and
    a processor in communication with the memory, the processor configured to:
        receive a request for adding the entry for the file;
        determine that an instance of directory metadata associated with the entry for the file does not exist in a directory volume that stores the directory metadata and not the file metadata in a first tier of the tiered storage system, wherein a file volume that is separate from the directory volume stores the file metadata and not the directory metadata in a second tier of the tiered storage system;
        allocate an instance of file metadata associated with the file in the file volume;
        generate the instance of directory metadata associated with the entry for the file in the directory volume, the instance of directory metadata associated with the entry for the file comprising an identifier;
        determine a shard volume to store data for the file as one or more shards in a third tier of the tiered storage system; and
        add the data for the file to the shard volume.

2. The tiered storage system of claim 1, wherein the instance of file metadata comprises:
    a shard volume identifier identifying the shard volume; and
    a shard identifier associated with each of the one or more shards and identifying the file within the shard volume.

3. The tiered storage system of claim 1, wherein the processor is further configured to identify the shard volume within a group of shard volumes based on load information.

4. The tiered storage system of claim 3, wherein the processor is further configured to reallocate the one or more shards to another shard volume within the group of shard volumes based on the load information.

5. The tiered storage system of claim 1, wherein the processor is further configured to identify the file volume within a group of file volumes.

6. The tiered storage system of claim 1, wherein the instance of file metadata comprises a file size and a maximum data length for a shard.

7. The tiered storage system of claim 1, wherein the directory volume corresponds to a first storage space and the file volume corresponds to a second storage space that is separate from the first storage space.

8. A method of adding an entry for a file into a tiered storage system that separates storage of directory metadata, file metadata, and shard data on volumes for scalability of independent tiers, comprising:
    receiving a request for adding the entry for the file;
    determining that an instance of directory metadata associated with the entry for the file does not exist in a directory volume that stores the directory metadata and not the file metadata in a first tier of the tiered storage system, wherein a file volume that is separate from the directory volume stores the file metadata and not the directory metadata in a second tier of the tiered storage system;
    allocating an instance of file metadata associated with the file in the file volume;
    generating the instance of directory metadata associated with the entry for the file in the directory volume, the instance of directory metadata associated with the entry for the file comprising an identifier;
    determining a shard volume to store data for the file as one or more shards in a third tier of the tiered storage system; and
    adding the data for the file to the shard volume.

9. The method of claim 8, wherein the instance of file metadata comprises:
    a shard volume identifier identifying the shard volume; and
    a shard identifier associated with each of the one or more shards and identifying the file within the shard volume.

10. The method of claim 8, further comprising identifying the shard volume within a group of shard volumes based on load information.

11. The method of claim 10, further comprising reallocating the one or more shards to another shard volume within the group of shard volumes based on the load information.

12. The method of claim 8, further comprising identifying the file volume within a group of file volumes.

13. The method of claim 8, wherein the instance of file metadata comprises a file size and a maximum data length for a shard.

14. The method of claim 8, wherein the directory volume corresponds to a first storage space and the file volume corresponds to a second storage space that is separate from the first storage space.

15. Non-transitory computer-readable storage media storing instructions that, when executed by a processor, perform operations for adding an entry for a file into a tiered storage system that separates storage of directory metadata, file metadata, and shard data on volumes for scalability of independent tiers, the operations comprising:
    receiving a request for adding the entry for the file;
    determining that an instance of directory metadata associated with the entry for the file does not exist in a directory volume that stores the directory metadata and not the file metadata in a first tier of the tiered storage system, wherein a file volume that is separate from the directory volume stores the file metadata and not the directory metadata in a second tier of the tiered storage system;
    allocating an instance of file metadata associated with the file in the file volume;
    generating the instance of directory metadata associated with the entry for the file in the directory volume, the instance of directory metadata associated with the entry for the file comprising an identifier;
    determining a shard volume to store data for the file as one or more shards in a third tier of the tiered storage system; and
    adding the data for the file to the shard volume.

16. The non-transitory computer-readable storage media of claim 15, wherein the instance of file metadata comprises:
    a shard volume identifier identifying the shard volume; and
    a shard identifier associated with each of the one or more shards and identifying the file within the shard volume.

17. The non-transitory computer-readable storage media of claim 15, wherein the operations further comprise identifying the shard volume within a group of shard volumes based on load information.

18. The non-transitory computer-readable storage media of claim 17, wherein the operations further comprise reallocating the one or more shards to another shard volume within the group of shard volumes based on the load information.

19. The non-transitory computer-readable storage media of claim 15, wherein the operations further comprise identifying the file volume within a group of file volumes.

20. The non-transitory computer-readable storage media of claim 15, wherein the instance of file metadata comprises a file size and a maximum data length for a shard.

\* \* \* \* \*